(12) United States Patent
Roethle et al.

(10) Patent No.: US 12,743,730 B2
(45) Date of Patent: Sep. 22, 2026

(54) END-TO-END MODEL LEARNING FOR DISTRIBUTED ENERGY RESOURCE MANAGEMENT SYSTEMS

(71) Applicant: PowerFlex Systems, LLC, San Diego, CA (US)

(72) Inventors: Justin Roethle, Milwaukee, WI (US); Rajat Sethi, San Diego, CA (US); Loic Vallance, San Diego, CA (US)

(73) Assignee: PowerFlex Systems, LLC, San Diego, CA (US)

( * ) Notice: Subject to any disclaimer, the term of this patent is extended or adjusted under 35 U.S.C. 154(b) by 0 days.

(21) Appl. No.: 18/986,464

(22) Filed: Dec. 18, 2024

(65) Prior Publication Data

US 2025/0209549 A1 Jun. 26, 2025

Related U.S. Application Data

(60) Provisional application No. 63/613,994, filed on Dec. 22, 2023.

(51) Int. Cl.
*G06Q 50/06* (2024.01)
*G06N 20/00* (2019.01)

(52) U.S. Cl.
CPC ............. *G06Q 50/06* (2013.01); *G06N 20/00* (2019.01)

(58) Field of Classification Search
CPC ............................... G06Q 50/06; G06N 20/00
See application file for complete search history.

(56) References Cited

U.S. PATENT DOCUMENTS 8,583,551 B2 * 11/2013 Littrell .................. G06Q 20/14 705/40
9,771,834 B2 * 9/2017 Cheng ................ G06Q 30/0283
(Continued)

OTHER PUBLICATIONS

Seyed Azad Nabavi, Deep Learning in Energy Modeling: Application in Smart Buildings With Distributed Energy Generation, 2021, p. 125439-125440 (Year: 2021).*
(Continued)

*Primary Examiner* — Ibrahim N El-Bathy
(74) *Attorney, Agent, or Firm* — Dinsmore & Shohl LLP

(57) ABSTRACT

Certain aspects of the present disclosure provide techniques for selecting and training a forecasting model for a distributed energy resource management system. An example method includes selecting a forecasting model from a plurality of candidate forecasting models; training the selected forecasting model using accuracy measurements comprising at least one of root mean squared error (RMSE), mean absolute error (MAE), or mean squared error (MSE); generating forecasting output data from the trained forecasting model based on predetermined test data; running a simulation using the forecasting output data, the simulation utilizing optimization logic and constraints to simulate control behaviors of distributed energy resources, the simulation being run by generating operating set points based on the forecasting output data to yield an energy cost result; and providing the energy cost result as feedback for determining differential weightings applied to one or more of the accuracy measurements and selection of an updated forecasting model.

20 Claims, 12 Drawing Sheets

(56) References Cited

U.S. PATENT DOCUMENTS

2023/0336340 A1* 10/2023 Polleri ................ G06F 11/3466
2024/0403671 A1* 12/2024 Barrad ..................... G06N 7/01

OTHER PUBLICATIONS

International Search Report issued on Mar. 27, 2025 for PCT Application No. PCT/US2024/060805 filed Dec. 18, 2024.

Severin Nowak et al., "Cloud-based DERMS Test Platform Using Real-time Power System Simulation", 2018 IEEE Power & Energy Society General Meeting (PESGM), IEEE, Aug. 5, 2018.

* cited by examiner

END-TO-END MODEL LEARNING FOR DISTRIBUTED ENERGY RESOURCE MANAGEMENT SYSTEMS

CROSS-REFERENCE TO RELATED APPLICATIONS

This application claims the benefit of and priority to U.S. Provisional Patent Application No. 63/613,994, filed on Dec. 22, 2023, the entire contents of which are hereby incorporated by reference.

INTRODUCTION

Distributed energy resource management systems (DERMS) provide intelligent coordination capabilities for optimizing renewable energy generation, storage, and loads across energy infrastructure deployments. Typical use cases encompass commercial and industrial environments such as corporate campuses, manufacturing facilities, data centers, logistics hubs, retail chains, hospitals, and university settings. DERMS platforms interface with on-site assets like solar photovoltaic systems, wind turbines, combined heat and power plants, lithium-ion battery storage banks, electric vehicle chargers, smart inverters, automated building controls and other digitally controllable equipment involved in facility or microgrid electricity supply and consumption. DERMS utilize forecasting to predict future energy production and consumption, allowing optimization algorithms to schedule electric vehicle charging, battery usage, and other controllable assets to minimize a customer's energy costs.

Accurate forecasts are important for effective DERMS optimization. However, typical forecasting model selection relies on generic accuracy metrics like root mean squared error (RMSE) that do not account for the unique objectives of DERMS optimization. For example, over-prediction errors may be more detrimental than under-prediction errors depending on a customer's time-of-use pricing schedule. Previous approaches fail to close the loop between forecasting performance and actual energy cost outcomes. Models may perform well on paper using standard accuracy metrics, but may still fail to provide optimization inputs that minimize real-world costs. Furthermore, changes to a customer's operations, contracted energy pricing, or installed equipment over time can diminish initially positive results.

SUMMARY

Certain aspects are related to a method for selecting and training a forecasting model for a distributed energy resource management system (DERMS). The method may include selecting a forecasting model from a plurality of candidate forecasting models comprising at least two different types of models; training the selected forecasting model using accuracy measurements comprising at least one of root mean squared error (RMSE), mean absolute error (MAE), or mean squared error (MSE); generating forecasting output data from the trained forecasting model based on a predetermined test data set; running a simulation using the forecasting output data, the simulation utilizing optimization logic and constraints to simulate control behaviors of distributed energy resources comprising at least one of photovoltaic solar panels, energy storage systems, or electric vehicle charging stations, the simulation being run by generating operating set points over a specified timeframe based on the forecasting output data to yield an energy cost result based on delivered energy expenditures; and providing the energy cost result as feedback for a) determining differential weightings applied to one or more accuracy measurements of the accuracy measurements by increasing penalties applied to the one or more accuracy measurements to penalize over-prediction errors based on time-of-use pricing, and b) selection of an updated forecasting model from the plurality of candidate forecasting models by comparing the energy cost result against a baseline energy cost to identify one or more forecasting models of the plurality of candidate forecasting models that minimize deviations from the baseline energy cost.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those described herein; and a processing system comprising means for performing the aforementioned methods as well as those described herein.

The following description and the related drawings set forth in detail certain illustrative features of one or more aspects.

DESCRIPTION OF THE DRAWINGS

The aspects set forth in the drawings are illustrative and exemplary in nature and not intended to limit the disclosure. The following detailed description of the illustrative aspects can be understood when read in conjunction with the following drawings, where like structure is indicated with like reference numerals and in which.

DETAILED DESCRIPTION

Figure 1:
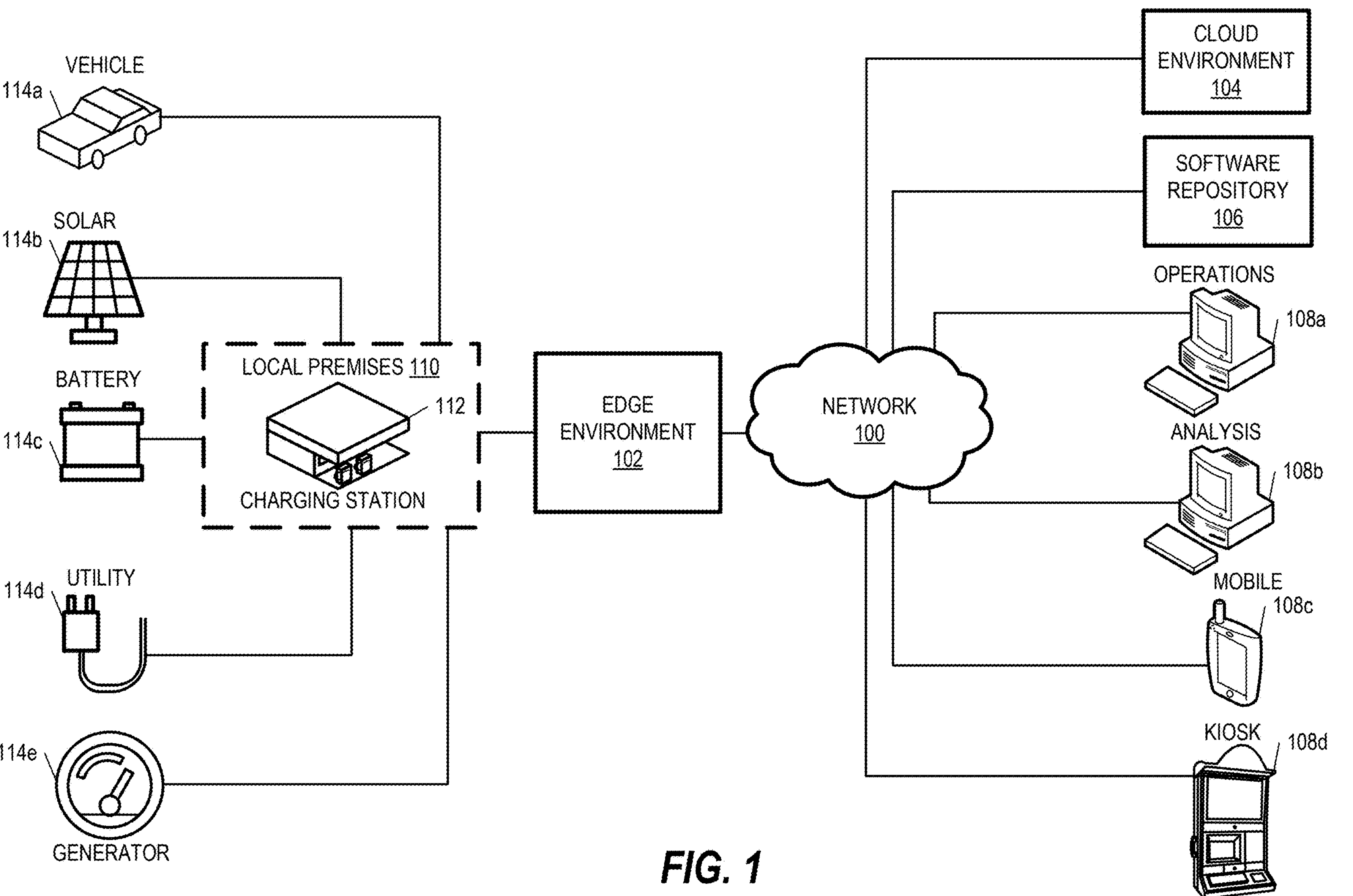
FIG. 1 depicts an example networked computing environment including edge and cloud systems that may be controlled by a distributed energy resource management system (DERMS), according to aspects provided herein.

Aspects disclosed herein include systems and methods for selecting and training a forecasting model for a distributed energy resource management system (DERMS). Rather than relying on generic accuracy metrics, the disclosed techniques may (e.g., directly) evaluate forecasting model performance based on actual energy cost outcomes simulated using the optimization algorithms inherent to DERMS operation. By closing the loop between forecasting and optimization, models can be selected and tuned to align with site-specific DERMS objectives related to energy cost minimization and electric vehicle charging demands.

In some examples, model training and selection may be focused (e.g., specifically) on matching predictive behaviors to specialized DERMS optimization objectives centered around cost minimization, charging delivery, peak shaving, etc. for a particular site. For example, a simulation-based analysis may evaluate candidate forecasting models by quantifying performance gaps between model-driven optimization outputs and ground truth operational outcomes over relevant cost and delivery metrics. This may reveal long-term model deficiencies from generic accuracy metrics alone. Integration of model selection with optimization simulations may ensure chosen model variants capture site-specific operational constraints, load behaviors, and grid interconnect realities that may (e.g., directly) impact costs.

The optimization-centric forecasting model selection techniques disclosed herein may provide a technical solution to the problem of misaligned prediction capabilities within DERMS. Integrating trainable models (e.g., directly) with DERMS optimization simulators may provide forecasting logic that is customized to a site's distinct operational objectives that may center around cost minimization, charging delivery, peak shaving, etc. The disclosed techniques may advance conventional model reliance on generic accuracy and evaluation metrics which may be inconsistent with real-world platform optimization behaviors. Further, the use of continuous retraining processes that are responsive to new operational data may facilitate adaptive forecast-to-optimization alignments tailored to evolving consumption patterns, equipment changes, grid interconnect limitations, or other volatility.

The disclosed techniques may technically enable forecasting model customization which may be tailored to specialized DERMS optimization constraints, as may be contrasted with being limited by generic averaged inaccuracies. Incorporating site-specific elements like metrology sensor streams, weather forecasts, EV charging requests, electricity pricing tariffs, and modeled hardware behaviors into tuned model selection may further long-term cost improvements that may generally be unachievable from predefined and non-adaptable logic. Incorporating site-specific elements into tuned model selection may provide site operators the ability to optimize energy expenditures, consumption shaping, charging coordination, and renewable energy utilization based on model variants (e.g., directly) aligned with operational realities.

Example Computing Environment

Referring now to the drawings, FIG. 1 depicts an example computing environment supporting a DERMS instance, according to aspects provided herein. In certain aspects, edge environment 102 and connected assets like electric vehicles, solar systems, and energy storage systems may be controlled by a distributed energy resource management system (DERMS) platform. As illustrated, the example computing environment includes a network 100 that is coupled to an edge environment 102, a cloud environment 104, a software repository 106, as well as ancillary devices 108. The network 100 may be configured as any wide area network (WAN, such as the internet, power network, cellular network, etc.) or other network for facilitating communication among the edge environment 102, the cloud environment 104, the software repository 106, and the ancillary devices 108.

Edge environment 102 may generally be deployed at site (illustrated as "local premises") 110 to provide various services, including coordination and optimization of energy assets 114, such as charging of electric vehicles (e.g., EV 114*a*) using charging station 112 and various distributed energy sources (DERs), such as solar device 114*b*, battery energy storage system (BESS) 114*c*, a grid connection to utility 114*d*, and generator 114*e* (e.g., an onsite diesel, natural gas, or other type of fueled generator). Generally, the aforementioned DERs may provide energy to the charging station 112 and/or use energy from the charging station 112 (e.g., by way of a backflow of energy from EV 114*a* to other aspects of site 110). In some aspects, charging station 112 may send excess energy back to the BESS 114*c* and/or to utility 114*d*. Generally, edge environment 102 may monitor and/or modify the energy sent to and received from the DERs to optimize various tasks, such as charging of energy assets 114.

Charging station 112 may utilize various communication protocols, such as open smart charging protocol (OSCP), open charge point interface (OCPI), ISO 15118, OpenADR, etc. and may represent Level 1, Level 2, Level 3, and higher-level charging stations, as applicable. Generally, the "level" of a charging station refers to the power level and/or ability to provide electric power to a device being charged.

Edge environment 102 is configured as an interface between various aspects of site 110 and network 100. In various aspects, compute resources for performing different functions at a site, such as optimization of EV charging, may be split between local compute resources in edge environment 102 and remote compute resources, e.g., in cloud environment 104 of FIG. 1.

Cloud environment 104 is coupled to the edge environment 102 via the network 100 and may be configured for further processing of data, as described herein. While FIG. 1 depicts a single cloud environment 104 that serves a single edge environment 102, this is merely an example, as some aspects may be configured such that the cloud environment 104 may serve a plurality of edge environments 102 that each serve one or more sites 110, one or more charging stations 112, one or more DERs, and the like.

Software repository 106 is also coupled to site 110 via network 100. Software repository 106 may be configured as a platform to program, store, manage, control changes, etc. to software that is implemented in edge environment 102 and/or cloud environment 104. In some aspects, software repository 106 may be configured as a proprietary service and/or may be provided by a third-party, such as GitHub™. Additionally, some aspects may be configured such that the software repository 106 is provided by the same entity that manages the cloud environment 104. As such, these aspects may be configured such that software repository 106 and cloud environment 104 may be combined.

Also depicted in FIG. 1 are the ancillary devices 108. Ancillary devices 108 may include an operations device 108*a*, an analysis device 108*b*, a mobile device 108*c*, a kiosk 108*d*, and/or other devices. Specifically, operations device

108*a* may be utilized to monitor and/or alter operations of the environment provided in FIG. 1. The analysis device 108*b* may analyze utilization, operation, charging, and/or other features of the example computing environment. The mobile device 108*c* may represent an administrator device and/or a user device. As a user device, the mobile device 108*c* may initiate charging, payment, and/or perform other user-specific actions. As an administrator device, the mobile device 108*c* may perform administrative operations, analysis, and/or perform other actions. The kiosk 108*d* may be located at one of the charging stations 112 and/or remote therefrom and may provide user-specific or administrative actions, similar to that of the mobile device 108*c*. In some aspects, administrators may use the kiosk 108*d* to view information about the site or make changes. As will be understood, the ancillary devices 108 may each include a processor, a memory component, and/or other hardware and/or software for performing the functionality provided herein. It should be understood that while kiosk 108*d* is depicted as being remote from site 110, some aspects may not be configured in this manner. Specifically, some aspects may utilize a local kiosk 108*d*, which may communicate via a local network and/or the network 100 for providing the services described herein.

Software Configuration for Example Edge Environment

Figure 2:
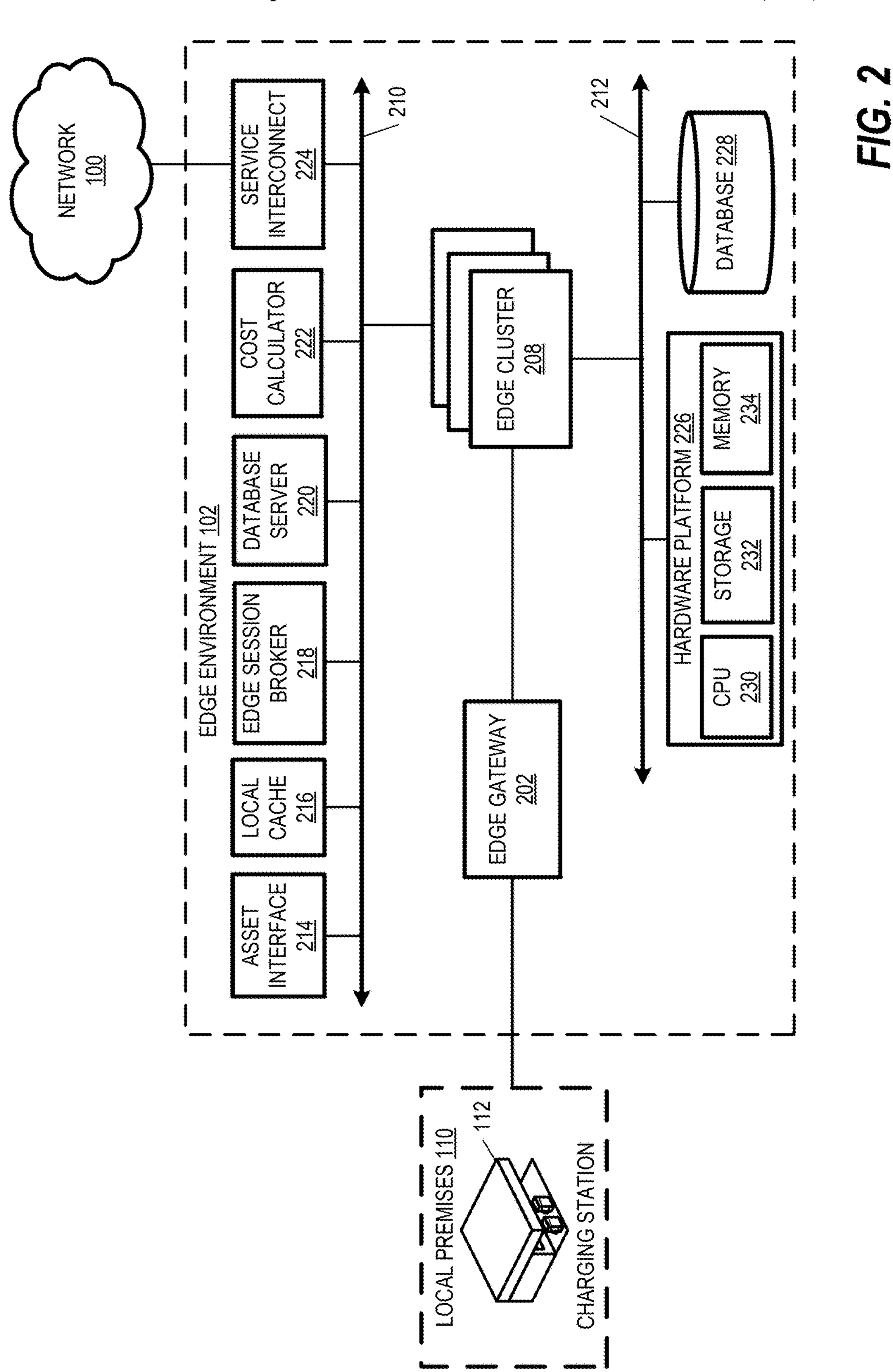
FIG. 2 depicts a software configuration for an example edge environment, according to aspects provided herein.

FIG. 2 depicts a software configuration for an example edge environment (edge environment 102), according to aspects provided herein. As illustrated, the edge environment 102 may be coupled to the charging stations 112 via an edge gateway 202. Also included in the edge environment 102 are a neural autonomic transport system (NATS) edge cluster 208, which is coupled to communication bus 210 and hardware bus 212. The communication bus 210 may be coupled to an asset interface 214, a local cache 216, an edge session broker 218, a database server 220, a cost calculator 222, and a service interconnect 224. Similarly, the hardware bus 212 may be coupled to a hardware platform 226, which may include a processor, such as CPU 230, storage component 232, memory component 234, and/or other hardware components. Also coupled to hardware bus 212 is a database 228.

The charging station 112 (e.g., a Level 2 charging station) may be configured for serial bus communication, communication via a peer-to-peer communication protocol, such as Zigbee, and/or other wired or wireless communication protocol. The edge gateway 202 may be configured to receive data, such as electric charging data, price charge data, vehicle data, etc. from the charging stations 112 and/or vehicles that are being charged. Additionally, the edge gateway 202 may be configured to abstract data received from the charging stations 112 to remove protocol specific distinctions. Thus, data output from the edge gateway 202 may be protocol relative to the protocol of data utilized by the particular charging stations 112. The edge gateway 202 may then send the data to the edge cluster 208.

The edge cluster 208 may be the central message center in various aspects. For example, when a user plugs a vehicle into a charging station 112, the edge cluster 208 receives data from the edge gateway 202, parses that data to access state data, and causes the state data to be sent to the database server 220. The edge cluster 208 also receives the data and creates a session entry, which may be stored in the local cache 216. The edge cluster 208 may additionally send the session entry to the cloud environment 104. The edge session broker 218 may also receive data related to the new session and may query the database server 220 to access additional session data and determine a charge curve. Further, the edge cluster 208 may enable communication of DERMS control signals, set points, and data payloads to assets. The asset interface 214 may serve as a conduit for sending DERMS-derived metering set points, charge levels, power limits, and other operating guidance to distributed energy hardware like batteries and EV supply equipment.

The edge session broker 218 may then send this data to the edge cluster 208, where the data may be sent to the edge gateway 202 for potentially sending back to one or more charging stations 112. Information that may be reported might include, but is not limited to, current delivered over time (e.g., amperes), total energy delivered (e.g., kWh), etc. The charging stations 112 may report any errors back to the edge cluster 208. The cost calculator 222 may be engaged to access pricing data from the cloud environment 104 and may calculate costs incurred based on delivered energy, expected costs prior to charging, idle time interval, parking time interval, etc. The asset interface 214 may be a software interface between the edge environment 102 and the energy assets 114.

It should be understood that the edge cluster 208 is configured such that any message received by the edge cluster 208 may also be sent to the cloud environment 104, for example, if there is an interested subscriber. If not, the data may remain with the edge cluster 208. Thus, if a user of the mobile device 114*c* (of FIG. 1) desires to claim a session, the mobile device 114*c* does not need to access the edge environment 102 directly. Instead, the mobile device 114*c* may connect with the cloud environment 104 (e.g., via API 514 of FIG. 5), which may send a message to the edge cluster 208 with an instruction to claim the session. As will be understood, the service interconnect 224 may be configured for establishing an HTTP, TCP, and/or other type of communication with the cloud environment 104 via the network 100.

Additionally, the hardware platform 226 represents any hardware for facilitating the processes and actions described herein. Specifically, the CPU 230 may be configured as any processor for executing instructions received from the hardware platform 226. The storage component 232 may be configured as long term storage, such as a hard drive or the like. The memory component 234 may include any of various types of read or access memory or the like. The database 228 may be configured for additional storage and may be housed with the other hardware and/or elsewhere.

Example Hardware Configurations

Figure 3A:
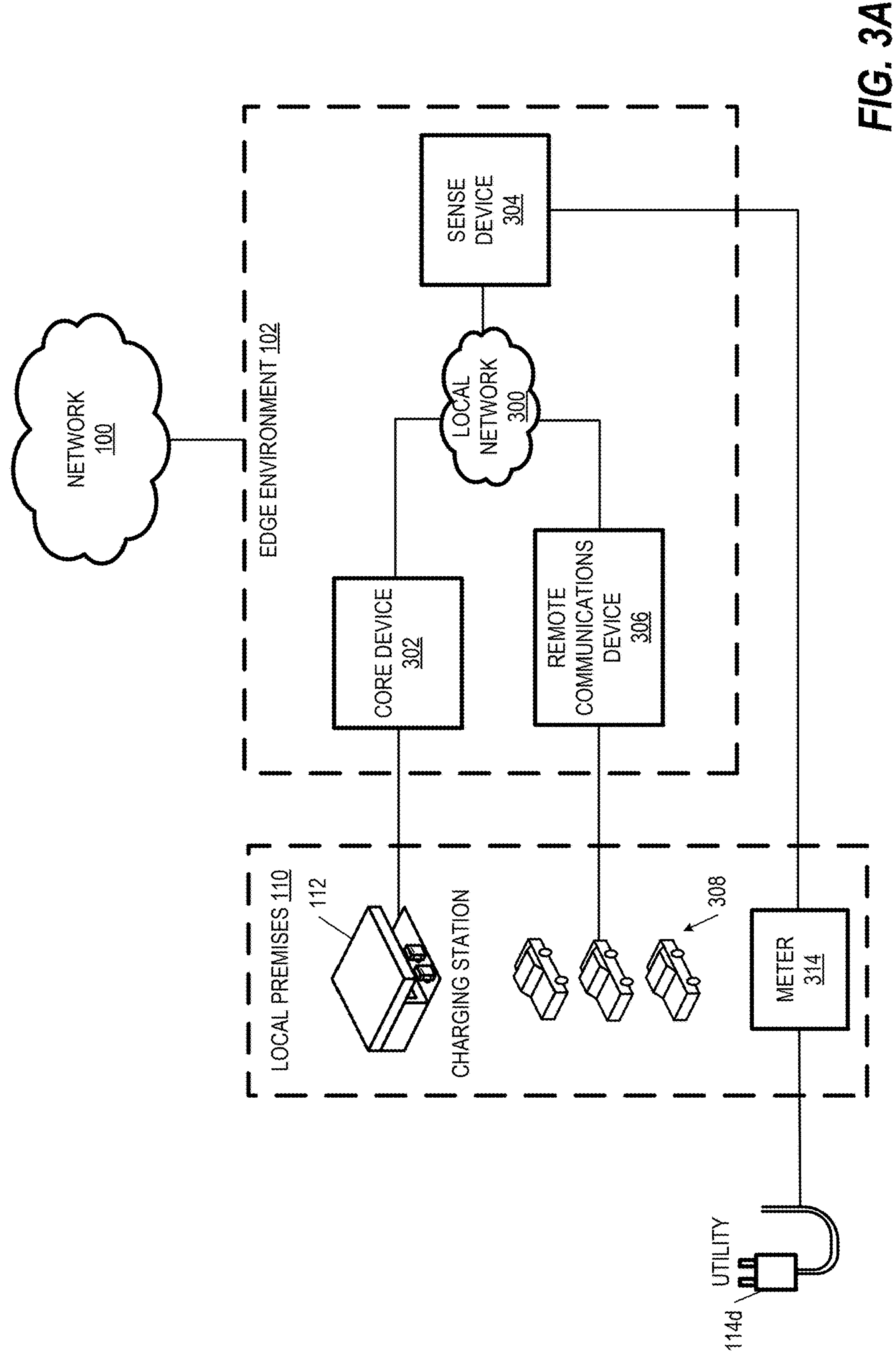
FIGS. 3A-3C depict example device configurations for the edge environment, according to aspects provided herein.
Figure 3B:
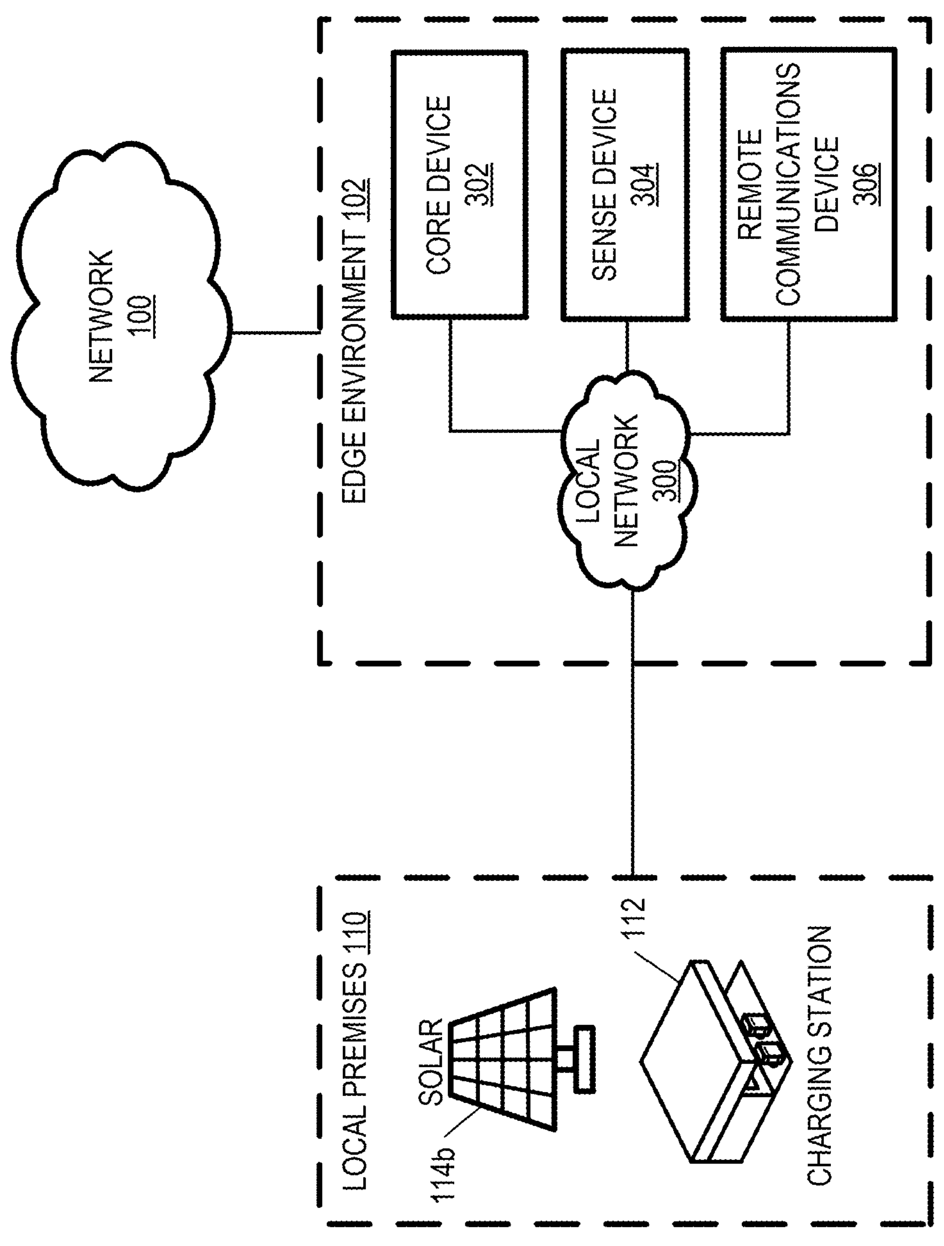
Figure 3C:
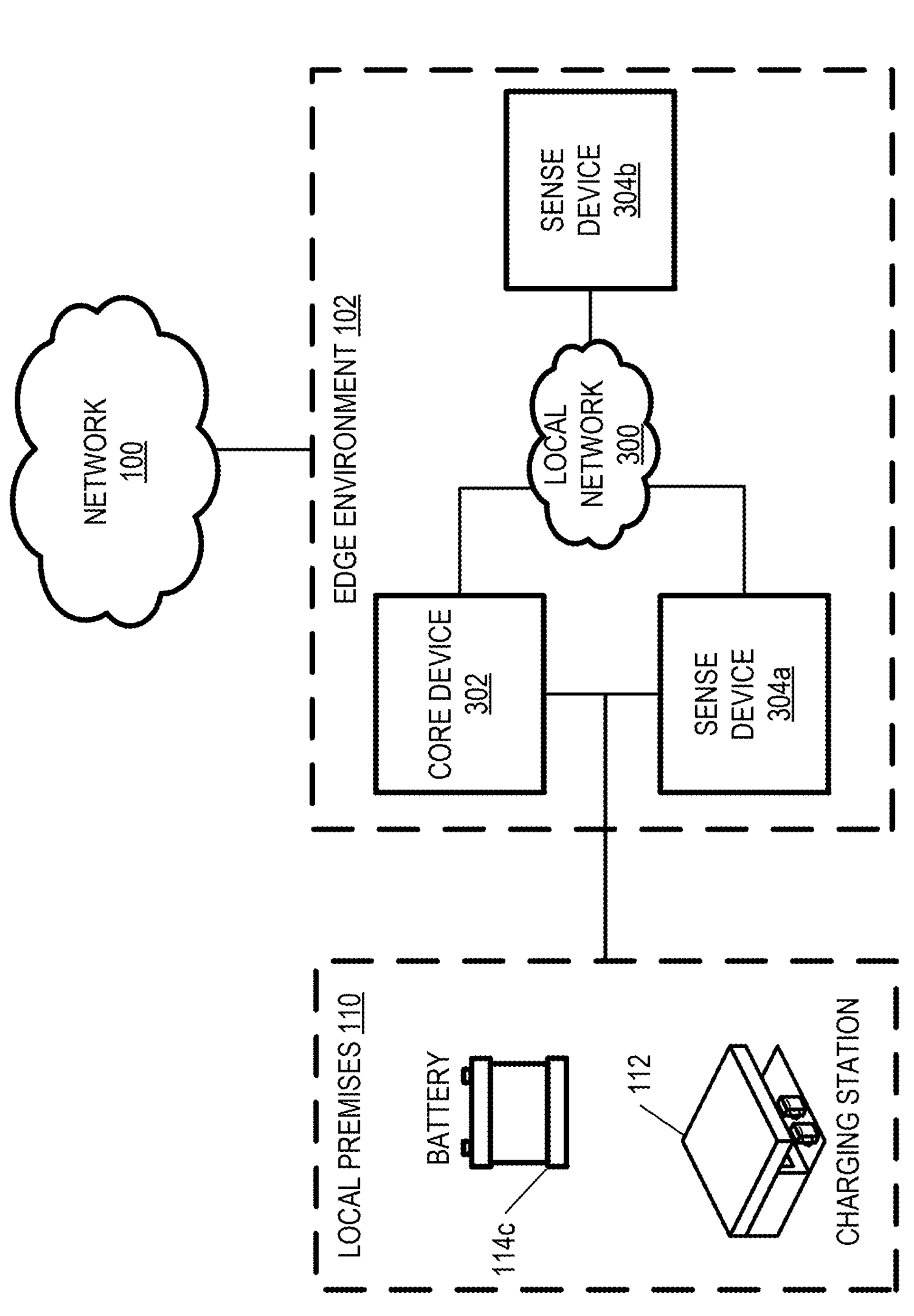

FIGS. 3A-3C depict example hardware configurations for the edge environment 102, according to aspects provided herein. Specifically, FIG. 3A depicts a charging solution. As illustrated, the charging station 112 is coupled to a local network 300 via core device 302. The local network 300 may include any local area network, Ethernet, personal access network, etc., as described above with reference to the network 100 from FIG. 1. The core device 302 may be installed physically within communications range of the chargers in the charging station 112. A sense device 304 may be installed, for example, in an electrical room or in another enclosure with electrical equipment of the charging station 112 to monitor (e.g., via meter 314) the main metering point for the local utility point of common coupling. This enables algorithms to cause the edge environment 102 to provide dispatch (e.g., an optimal dispatch) of EV charging power, subject to local energy rates and/or the vehicles currently charging. In the case that there are vehicles 308 using EV chargers that are out of communications range of the core device 302, such as at a sub-level of a parking garage, a remote communications device 306 may be included as required.

In FIG. 3A, the core device 302 may be the central processing device and serve as the communications hub. The core device 302 may provide optimization, load management, communication coordination, and data historian services. The core device 302 may communicate with the cloud environment 104 to get the latest optimization and load management set points for charging stations 112 and other assets. As such, the core device 302 may dispatch these set points through a local communications protocol (e.g., Wi-Fi) and/or via the remote communications device 306 to reach locations that are distant or hard to reach, such as charging stations for vehicles 308 at sub-levels of a parking garage or a rooftop solar inverter. The core device 302 may additionally collect data (e.g., directly) from energy assets 114 or through cloud-based communications with the network 100.

Power and energy metering data may be collected via the sense device 304. The sense device 304 may include a smart meter with support for multiple single- and three-phase loads with a local historian and Ethernet communication back to the device via the local network 300. It should be noted that additional sense devices 304 and remote communications devices 306 can be added to handle, for example, hard-to-reach situations, such as via a separate subpanel for energy metering of a new solar installation or for monitoring of a new inverter associated with a rooftop solar installation.

The core device 302 may facilitate optimization, load management, and other logic processing associated with a DERMS platform and relevant constraints. By interfacing with connected assets per the configurations shown, the core device 302 supports localization and execution of DERMS-based coordination schemes for the site (e.g., site 110)'s distributed energy equipment.

FIG. 3B depicts a solar application where the core device 302 and the sense device 304 are installed in the facility's electrical room or other common area. The sense device 304 can monitor the main metering point for the local utility as well as the solar production at tie-in breakers for the solar device 114*b*. The remote communications device 306 may be installed in a position to communicate directly with the solar device 114*b* and report the data received from the solar device 114*b* to the core device 302. Accordingly, the core device 302, the sense device 304, and the remote communications device 306 depicted in FIG. 3B may perform similar functions as those devices depicted in FIG. 3A.

FIG. 3C depicts a battery application where the core device 302 and the sense device 304 are installed physically near a BESS 114*c* installation. In cases where the BESS 114*c* is near the point of common coupling with the utility 114*d*, a single sense device 304*a* can monitor the full site. In cases where there is a significant distance to the metering point for the utility 114*d*, a second sense device 304*b* (or a plurality of second sense devices 304*b*) may be installed near the utility meter, such as in the electrical room.

Figures 4A, 4B, 4C:
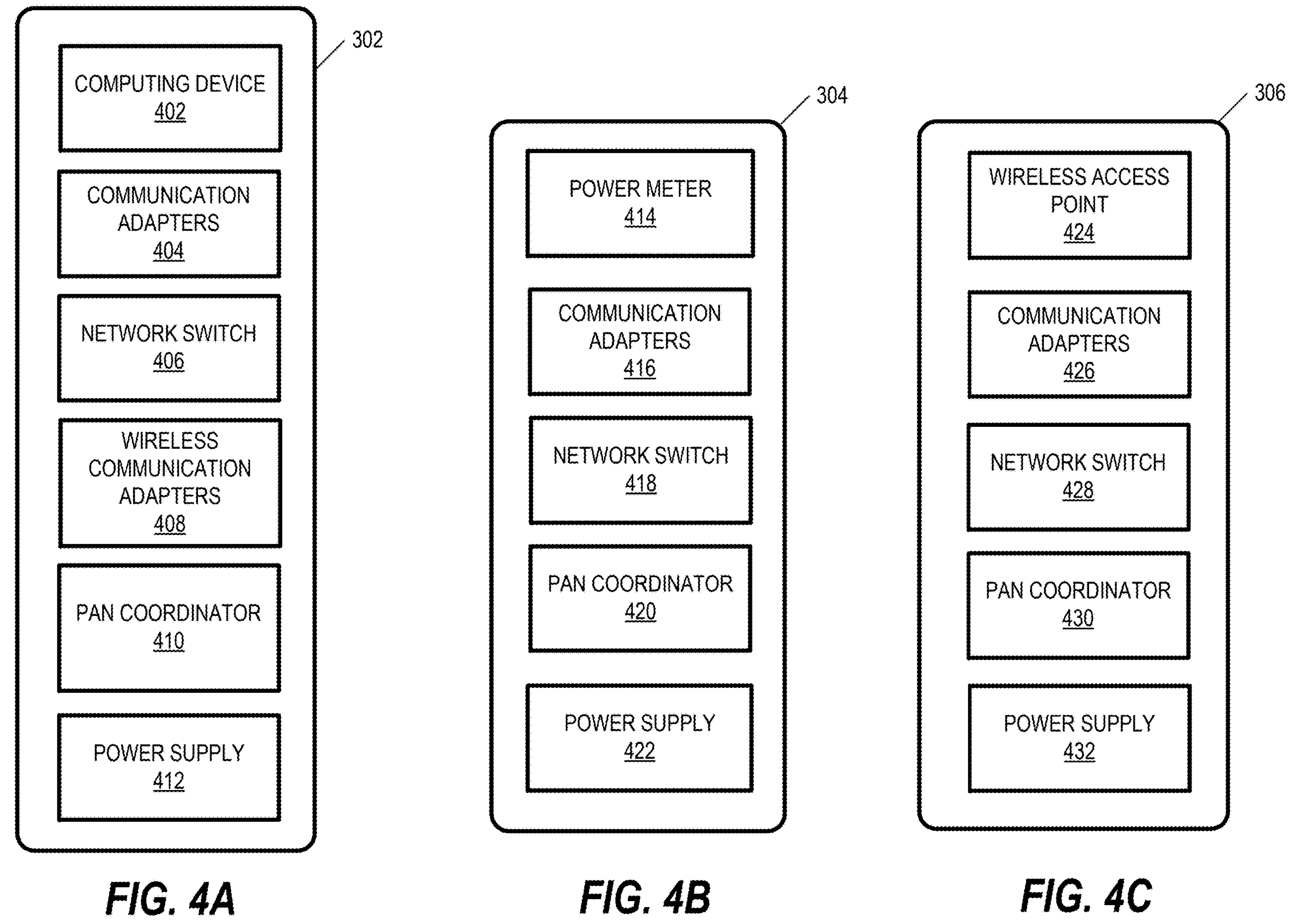
FIGS. 4A-4C depict example hardware components that may be utilized for the devices from FIGS. 3A-3C, according to aspects provided herein.

Example Hardware Components in Core, Sense, and Remote Communications Devices FIGS. 4A-4C depict hardware that may be utilized for the devices from FIGS. 3A-3C, according to aspects provided herein. Specifically, FIG. 4A depicts hardware components that may be present in a core device 302. In some aspects, the core device 302 is the brain where the energy optimization and adaptive load management functions are executed and dispatched. As illustrated, the core device 302 may include a computing device 402, a communication adapter 404 (or more than one), a network switch 406, a wireless communication adapter 408 (or more than one), a PAN coordinator 410, and a power supply 412. As will be understood, the computing device 402 may include a processor, a memory, and/or other components that a normal, specific purpose machine may utilize. In some aspects, the computing device 402 may include programmable logic control (PLC) infrastructure, while some aspects may utilize personal computer components for optimization, load management, communication coordination, and/or historian services.

The communication adapter(s) 404 may be configured for load balancing and otherwise managing communications. The network switch 406 may be configured for routing of network traffic, and may be configured as an Ethernet switch for communication to other nodes (e.g., the sense device 304, the remote communications device 306, and/or other core device 302), distributed energy resources, and/or energy based management systems. The computing device 402 and the communication adapters 404 may facilitate asset connectivity that enables hardware control interface capabilities on behalf of an overarching DERMS platform. Functions may include translating set points received from a cloud-based DERMS instance to device-native protocols for execution locally.

The wireless communication adapter(s) 408 may include a cellular modem, internet modem, Wi-Fi access point, etc. for facilitating wireless communications to the internet or other wide area network. Similarly, the PAN coordinator 410 may be configured to create and/or join communication connections with other devices. This may include a Zigbee coordinator, Bluetooth device, and/or other device for performing this function. The power supply 412 may be configured as a battery power, power port, etc.

FIG. 4B depicts hardware components of the sense device 304 from FIGS. 3A-3C. The sense device 304 may be configured as a smart-metering piece for collection and storage of power/energy data. The sense device 304 may include a smart meter with, for example, about 15-30 channels that can monitor both single-phase circuits and three-phase circuits. The sense device 304 may communicate meter data back to the core device 302 from meter locations such as electrical rooms, rooftop solar installations, EV chargers, and subpanels. These aspects may be optimized for ease of installation and reduced intrusion to the site where power over Ethernet (PoE) suffices for most installations from the core device 302. The sense device 304 may transmit data back to the core device 302 via a PoE switch.

As illustrated in FIG. 4B, the sense device 304 includes a power meter 414, a communication adapter 416 (or more than one), a network switch 418, a PAN coordinator 420, and a power supply 422. The power meter 414 may be utilized for monitoring single-phase and three-phase loads of power. The communication adapter(s) 416 may be utilized for facilitating communications between the sense device 304 and other devices. The network switch 418 may be a PoE (or other network protocol) switch for communication. Similarly, the PAN coordinator 420 may create and/or join personal area networks, such as via Zigbee, Bluetooth, and the like. The power supply 422 may include a power interface for providing power to the sense device 304.

As illustrated in FIG. 4C, the remote communications device 306 is a network-connectivity extension, (e.g., primarily) for EV charging or solar monitoring locations where Zigbee, Wi-Fi, or Ethernet is being extended to remote or difficult-to-reach locations such as remote subpanels, parking garage levels, or rooftop inverters. Some aspects are optimized for ease of installation and reduced intrusion to the site where PoE suffices for most installations from the core device 302. The remote communications device 306 may be configured to transmit data back to the core device 302 via the network switch 418.

Specifically, the remote communications device 306 may include a wireless access point 424, a communication adapter 426 (or more than one), a network switch 428, a PAN coordinator 430, and a power supply 432. The wireless access point 424 may be configured to extend wireless communication signals to chargers and/or other intelligent electronic devices. The communication adapter(s) 426 may be configured for facilitating communications between the remote communications device 306 and other devices. The network switch 428 may be configured as a PoE Ethernet switch and/or other network switch for communicating with the core device 302. The PAN coordinator 430 may be configured to create and/or join personal area networks, such as via Zigbee, Bluetooth, and the like. The power supply 432 may include a power interface for providing power to the remote communications device 306.

Example Cloud Environment Providing DERMS Platform

Figure 5:
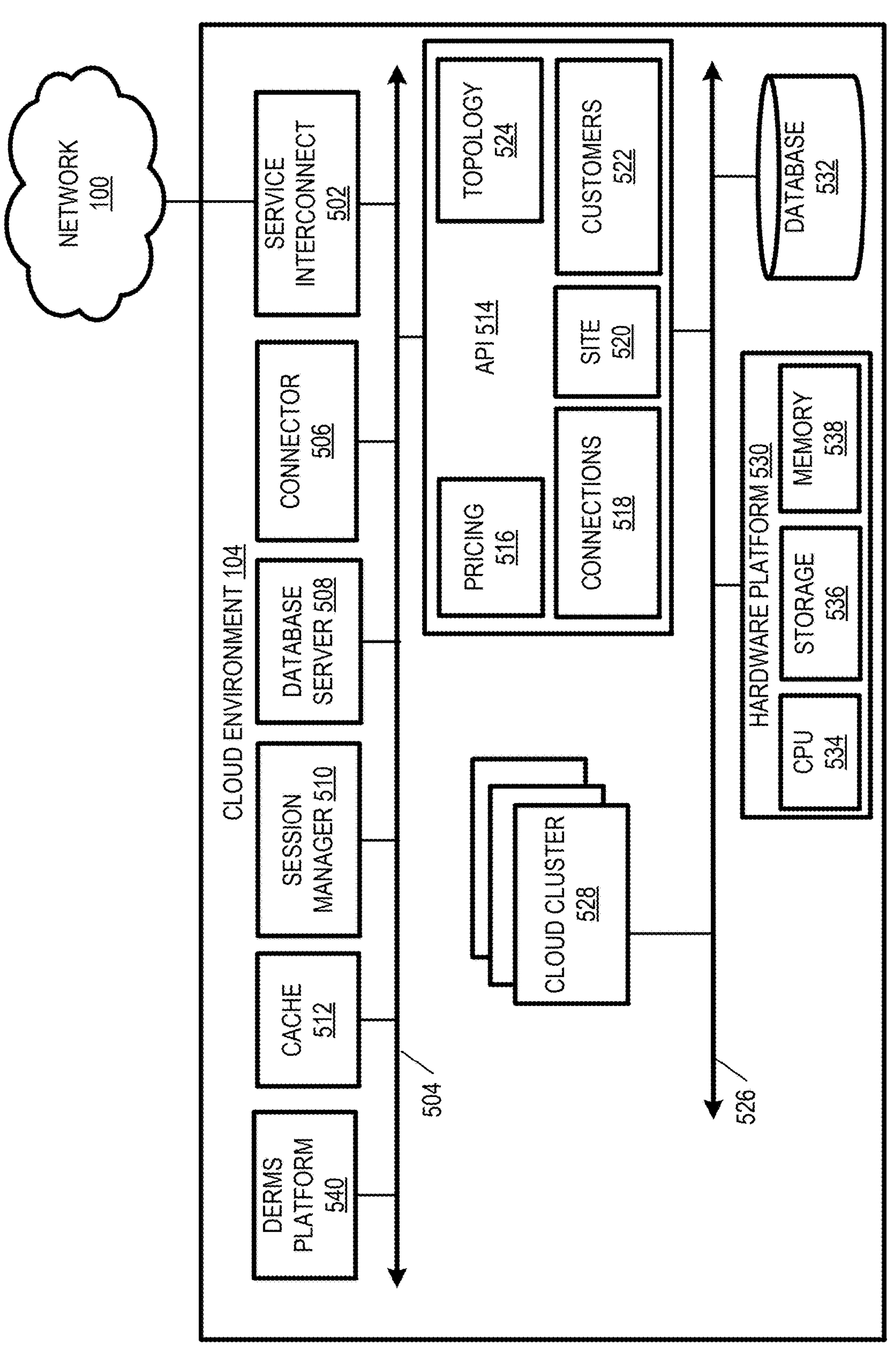
FIG. 5 depicts an example cloud environment supporting a DERMS instance, according to aspects provided herein.

FIG. 5 depicts a cloud environment 104 supporting a DERMS platform 540, according to aspects provided herein. As illustrated, the network 100 may couple to the cloud environment 104 via a service interconnect 502 that corresponds with the service interconnect 224 from FIG. 2. Similar to the service interconnect 224 from FIG. 2, the service interconnect 502 may be configured to facilitate an HTTP, TCP, and/or other communication portal through the network 100 to the edge environment 102 for the exchange of data between the edge environment 102 and the cloud environment 104. The service interconnect 502 is also coupled to a communication bus 504, which facilitates communication among various components of FIG. 5. Also connected to the communication bus 504 are the DERMS platform 540, a connector 506, a database server 508, a session manager 510, a cache 512, and an application programming interface (API) 514. The API 514 may include a pricing API 516, a connections API 518, a site API 520, a customers API 522, and a topology API 524. The API 514 may be implemented by the hardware platform 530. The hardware bus 526 is coupled to a NATS cloud cluster 528, as well as the hardware platform 530 and a database 532. The hardware platform 530 may include a CPU 534, a storage component 536, and a memory component 538.

The API 514 is a component of the cloud environment 104. As such, the API 514 and its sub-components (e.g., pricing API 516, connections API 518, site API 520, customers API 522, and/or topology API 524) may cause storage of and/or process site information, site topology, customers, connections to panels, constraints of panels, pricing information of each site, etc. The API 514 may also serve as a mobile backend by storing personal information of charge users (e.g., email, charging preferences, payment preferences, privileges, access, fleet information, etc.). The API 514 may additionally store peak charging configurations, data related to meter setup, etc.

When a vehicle is plugged into a charging station 112 (of FIG. 1), the edge session broker 218 (of FIG. 2) communicates connection information to the API 514. The connection information may include vehicle information, user information, charging station information, etc. The API 514 then creates a charge session object, which is stored in the cache 512. The cache 512 sends session data, along with topology constraints and the charge session object to the edge environment 102. The connector 506 may additionally cause the cloud cluster 528 to maintain the charge session object for retrieval by an interested party. As the session continues, the session manager 510 may be utilized to alter constraints of the session, which may cause the cloud cluster 528 to update the charge session object.

When a user claims a previously created session, for example, with the mobile device 114*c* (of FIG. 1), the database server 508 may create a database entry with the charge session, driver, along with energy request, willingness to pay, electricity purchased, etc. The connector 506 may update the cloud cluster 528 with the database entry. This data may then be sent to the edge environment 102. When the charge session ends (e.g., the vehicle is unplugged), that action will be added to the database entry and the database entry may be moved from a current sessions list to a completed sessions list. The API 514, connector 506, and session manager 510 provide platforms to exchange forecasting model data and asset control instructions between a cloud-based DERMS instance and the edge environment operational assets. Specifically, the pricing API 516 component gives DERMS visibility into real-time and forecasted tariff information from utilities for informing optimization decision making related to cost minimization and energy expenditure strategy.

Example DERMS Platform

Figure 6:
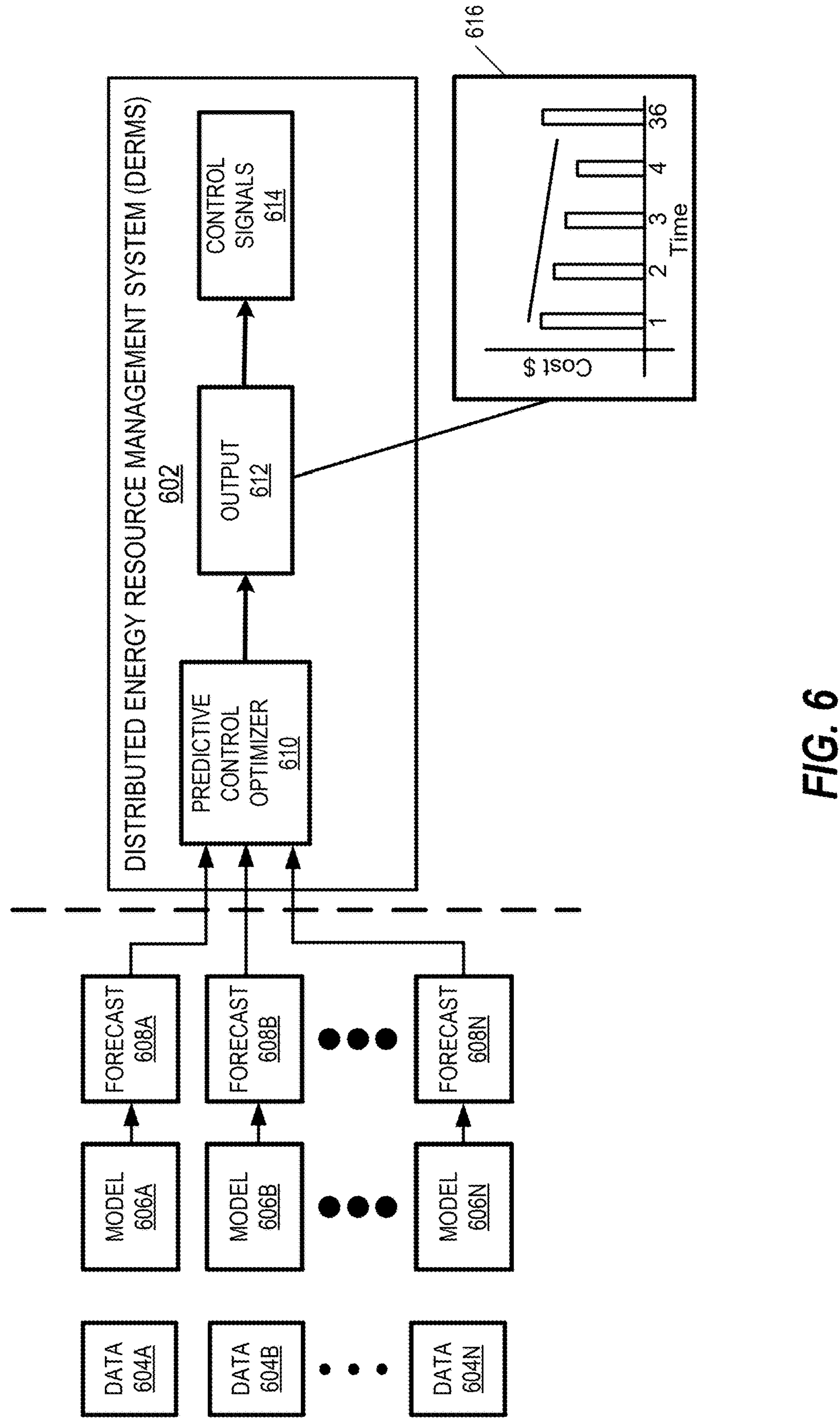
FIG. 6 depicts an overview of an example DERMS platform that leverages forecasting to optimize operation of assets toward goals like cost minimization, according to aspects provided herein.

FIG. 6 depicts details of an example DERMS platform 602 that provides intelligent coordination of energy assets 114 to optimize system objectives representative of key performance outcomes, constraints, and priorities. More specifically, the operational goals that the DERMS platform 602 may achieve through its optimization and control of assets like solar panels, batteries, and electric vehicle chargers may include, for example, minimizing energy costs from the grid by strategically using stored solar energy and battery resources, reducing peak demand charges by shaping load profiles to stay under targeted thresholds, and/or ensuring sufficient delivery of electric vehicle charging to meet driver needs. The priorities may also include additional site-specific targets such as capping self-consumption of on-site solar generation, adhering to time-based demand response event schedules, maintaining critical load support for identified sensitive equipment, etc. Weightings between the operational goals can also vary. For example, the DERMS platform 602 may prioritize grid peak shaving, while a workplace charging deployment may emphasize employee EV charging fulfillment over energy cost minimization.

In examples, real-time sensor data 604A-N may quantify site generation and loads for establishing predictive behavioral models 606A-N. In examples, one or more of the models 606A-N may be a cloud-based machine learning model that generates rolling multi-day forecasts 608A-N of solar production, facility usage, electric vehicle charging demand, and other quantities for planning operations of one or more sites 110 (of FIG. 1). These forecasts 608A-N, or predictions, feed one or more predictive control optimizers 610 that determine energy assets 114 coordination guidance over future intervals. Such coordination guidance can be provided as output 612. For example, predictive control optimizer 610 may take the latest forecasts 608A-N and establish operating schedules for assets over a period of time, such as the next 24-48 hours. In examples, an operating schedule can indicate an hourly charging plan for electric vehicles balanced against forecasted solar availability. Further, the output 612 of the predictive control optimizer 610 may include appropriate control signals 614 that are provided at the end of each prediction interval (e.g., 15 minutes) to actual devices. For example, the predictive control optimizer 610 can provide scheduled battery charge levels to the actual battery inverters of the energy assets 114. The predictive control optimizer 610 can also provide output control signals 614 that orchestrate battery usage, manage EV charging, and other energy assets 114 to achieve grid optimization goals.

More specifically, the predictive control optimizer 610 can adjust device control set points to reactively manage variability risks that deviate from prior expectations that formed the basis for the originally generated set points. The DERMS platform 602 may interface with gateway communication systems that translate set points into device-native control instructions. The output 612 of the DERMS platform 602 can be output control signals 614 that include protocols issuing charge commands, storage dispatch levels, sensor polling confirmations, and data payload transmissions to actuate energy assets 114 that may include smart inverters and EV chargers. As additional examples, the control signals 614 can include, but are not limited to battery inverter current injection ramp limits, electric vehicle supply equipment charging current carrying capacities, smart appliance average power constraints, and/or renewable inverter active power curtailments.

Accordingly, and as illustrated in chart 616, the trending of projected cumulative expenditures may combine delivered power costs for different optimization horizons that can include other costs, such as equipment wear impacts from forecasted changes in set points, such as charging/discharging cycles.

Accurate forecasts 608A-N are important for the optimization of the DERMS platform 602; however, typical forecasting models may be trained and/or selected using generic, or conventional, accuracy metrics like root mean squared error (RMSE) that do not account for the unique optimization objectives of a DERMS platform 602. For example, over-prediction errors may be more detrimental than under-prediction errors depending on a specific time-of-use pricing schedule. That is, DERMS platforms that rely on forecasts from models trained using generic, or conventional, accuracy metrics may fail to close the loop between forecasting performance and actual energy cost outcomes. Such models may perform well on paper using standard accuracy metrics, but may still fail to provide optimization inputs that minimize or adequately reduce real-world costs. Furthermore, changes to operations, contracted energy pricing, or installed equipment over time can diminish initially positive results. Therefore, an optimization-centric methodology that selects and tunes forecasting models that align with the load shaping goals and constraints of DERMS platforms 602 may provide many technical benefits as described herein, such as to close the loop between forecasting performance and actual energy cost outcomes. That is, energy cost performance can be embedded directly into the model training and selection process via simulated optimization runs. Additionally, periodic retraining capabilities may account for operational changes at sites over time.

As an example, suppose a corporation has installed a 500 kW solar array and 250 kW/500 kWh lithium-ion battery storage system at their manufacturing facility. This behind-the-meter distributed energy system may be controlled by a DERMS platform that uses solar production and building load forecasts to optimize battery usage on a 15-minute cycle to minimize demand charges and time-of-use energy costs imposed by the corporation's utility provider. During a hot summer week, a general solar forecasting model that feeds the DERMS platform used by the corporation may over-predict the next day's solar production due to an incoming marine layer with virtually no cloudiness of any kind. With no forecasted clouds, the site's DERMS platform may choose not to charge the batteries overnight to "save room" for the anticipated solar influx. However, in actuality, the marine layer may dissipate by morning, bringing a mostly cloudy sky, with the batteries remaining low through the late afternoon demand charge peak period, leading to high peak consumption charges.

To prevent such performance gaps, the corporation may utilize an optimization-centric forecasting model selection technique to optimize operational costs. Historical weather data and facility load profiles can be used to generate forecasts from a multitude of different models, model types, and tuning variants. The total energy costs may be tabulated for each model over a test dataset to quantify model performance based on actual cost outcomes rather than generic model accuracy. Accordingly, the optimization-centric forecasting model selection technique can select the model(s) that (e.g., best) align(s) with the objectives of DERMS platform 602 (e.g., specific to the corporation's utility rate structure for the example described above), local energy generation forecasts, and load demands. The chosen model (s) can then be updated as new operational data is gathered from the site. Additional details of the optimization-centric forecasting model training and selection technique are described with respect to FIG. 7.

Forecasting Model Training and Selection

Figure 7:
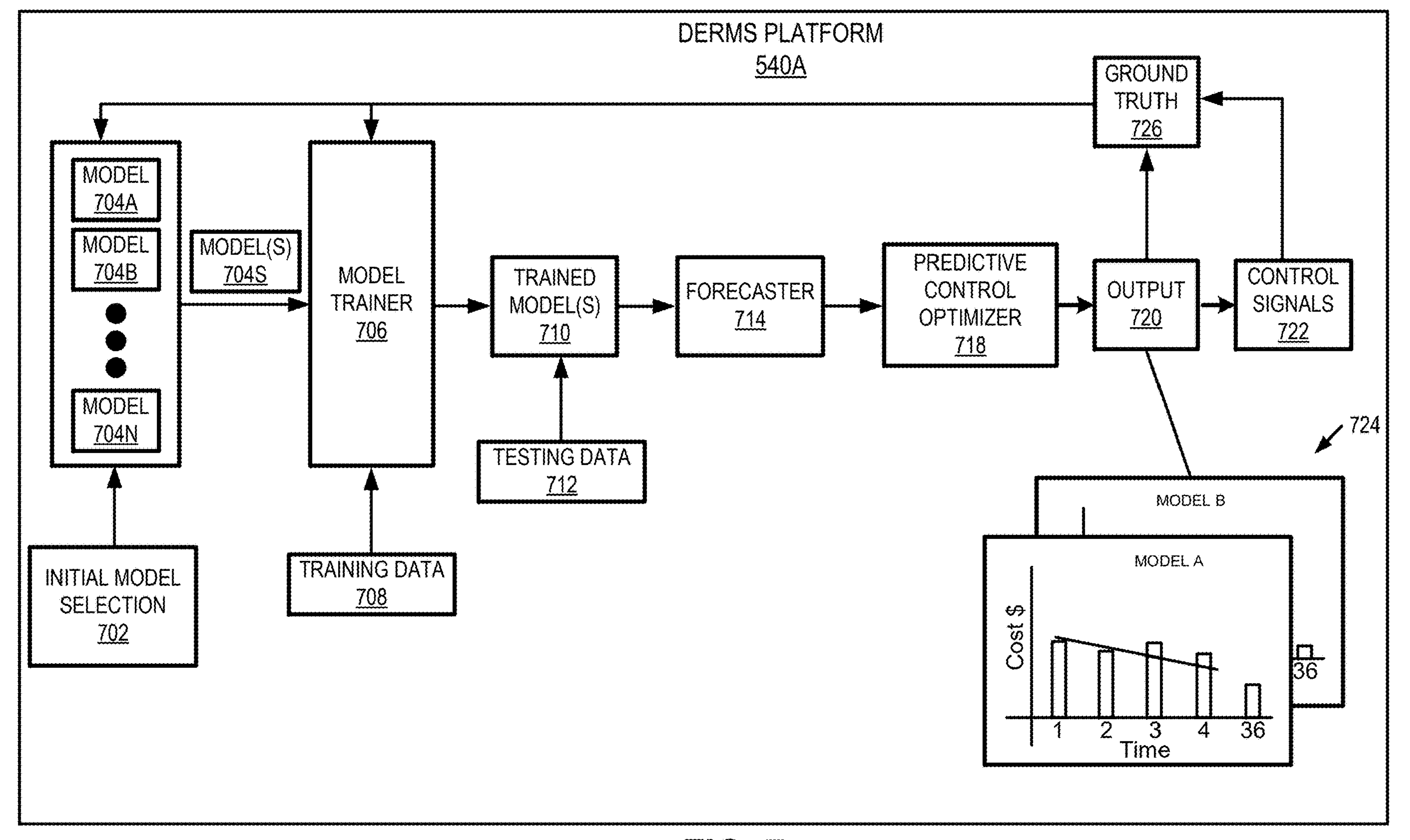
FIG. 7 depicts an example of selecting and tailoring forecast models to performance objectives of a DERMS via simulation testing, according to aspects provided herein.

FIG. 7 depicts details of a forecasting model training and selection technique which may be tailored to the unique distributed energy resource management system objectives using a DERMS platform (DERMS platform 540A). In certain aspects, iterative model tuning may leverage operational data to evaluate candidate model performance and obtain forecasts aligned with operational objectives and costs of a local site 110. Though shown as separate components, one or more of the components depicted in and described with reference to FIG. 7 may be implemented separately, jointly, or as any number of components that perform the discussed functions. Such components may be hardware and/or software, such as processors, memory, computer readable medium, instructions, code, etc.

At an initial model selection module 702, one or more candidate forecasting models 704S are initially selected from a collection of available forecasting models 704A-704N for assessment. The selected candidate forecasting model(s) 704S may encompass a diverse set of models spanning different training approaches, such as traditional time series models, machine learning models, statistical models, hybrid models, neural networks, autoregressive models, gradient boosting decision tree-based models, generalized linear models, linear regression models, etc. In examples, the selected candidate forecasting model(s) 704S may encompass any time series machine learning model.

The selected candidate forecasting model(s) 704S may be independently trained by a model trainer 706 using historical site-specific operational data that may comprise training data 708. The model trainer 706 may leverage patterns within the training data 708 to optimize model parameters and relationships using accuracy metrics like RMSE, MAE, or MSE. This yields a set of trained candidate forecasting models 710. In examples, each of the selected candidate forecasting model(s) 704S may be trained using training data 708 covering varying amounts of time or time spans. In some examples, a first candidate forecasting model may be trained over a different time span than a second candidate forecasting model.

The trained candidate forecasting models 710 may then be provided testing data 712 comprising past operational system snapshots, including variables like weather readings, day of week, solar intensity, load readings for a given amount of time, etc. At forecaster 714, each trained candidate forecasting model 710 may generate or predict forecasting outputs for those historical input scenarios. The model-predicted forecasts may be taken as if they were fresh forecasts relative to the timeframe of the testing data 712. In examples, the testing data 712 may vary in quantity and amount. For example, the testing data 712 may cover three months in one example while in another example, the testing data 712 may cover one month. Other examples may also be possible. In some examples, the testing data 712 provided to a trained candidate forecasting model may be different than testing data 712 provided to another trained candidate forecasting model.

The predicted forecasting outputs may be inputted into DERMS platform 540A that runs an optimization analysis using forecasted data instead of actual data. The DERMS platform 540A may model asset behaviors and site conditions in response to control signals 722 dispatched according to forecast-driven operation schedules from predictive control optimizer 718 of the DERMS platform 540A. This yields simulated optimization output(s) 720 reflecting (e.g., based on) forecast-related impacts on energy costs, EV charging services, electricity generation/usage, etc. over the simulation period.

Specifically, the DERMS platform 540A may replicate the optimization logic and hardware modeling of a real-world DERMS system. However, instead of leveraging actual operational data per normal operations, the DERMS platform 540A may be configured to utilize the predicted forecasting outputs from the trained candidate forecasting models 710. With forecasts being utilized instead of real-time readings, predictive control optimizer 718 of the DERMS platform 540A may generate operating schedules and control signals 722 that dictate simulated asset behaviors as if the forecasts were true.

The dispatched control signals 722 may simulate battery charge levels, EV charging currents, smart appliance power constraints, renewable power curtailments, and/or other set points for assets to follow. Corresponding equipment behavior modeling may predict site conditions like solar output, facility loads, and/or EV energy demands as if reacting to those forecast-driven controls. Simulated optimization outputs 720 may tabulate the simulated energy costs, charging services delivered, peak demand levels, etc. that emerge from the forecast-guided operations.

By simulating optimizations and outputs driven purely by model forecast accuracy, direct insights are gained into impacts from forecast errors and biases. Model over- or under-estimations may be revealed in final cost outcomes and charging services analytics. Model selection may thus isolate the true long-term operational effectiveness of each forecasting method rather than simply its paper-based accuracy.

The simulated optimization outputs 720 may be compared to ground truth data 726 captured over the actual simulation period window to quantify the alignment between the simulated operations and real performance. Gaps in cost outcomes, charging services, etc. may reveal deficiencies in the trained candidate forecasting models 710. Model selection may then focus on variants that (e.g., best) reduce these performance gaps. Specifically, the ground truth data 726 may indicate the actual conditions and outcomes over the simulation period window. This empirical data may capture metrics like energy costs accrued, EV charging services delivered, solar energy produced, etc. over a past timeframe for which forecast models may now generate predictions.

By comparing model-driven simulated optimization outputs 720 side-by-side with ground truth data 726, (e.g., direct) comparisons may quantify the gaps between simulated operating behaviors/decisions and reality. Discrepancies in total energy expenditures, charging energy served, consumption peak targets, etc. may expose outputs from the underlying trained candidate forecasting models 710 that may be used for further training and/or selection of models. For example, certain trained variants may be revealed to potentially misestimate certain quantities which may lead to suboptimal DERMS optimizations. Certain aspects described herein may address, for example, such misestimation of certain quantities through further training and/or selection of models.

FIG. 7 also depicts an example chart 724 of cost performance over optimization horizons. By quantifying projected long-term cost performance under each trained candidate forecasting model 710, the (e.g., most impactful) models aligned with minimizing operational expenditures can be identified through the optimization-centric selection technique. The example chart 724 can be used to visualize performance gaps that emerge between trained candidate forecasting models. Rather than relying just on generic accuracy metrics, bottom line cost impacts, such as operational costs, may allow finer model tuning targeted to financial objectives of a local site 110. As part of the iterative feedback-based selection approach, updated variants and models can be utilized to improve cost profiles on subsequent simulation runs.

A model selection process is thus able to concentrate on the model formulation, constraints, features and hyperparameters exhibiting the (e.g., strongest) connection to actual site operational objectives. In particular, model selection can focus on variants demonstrating smaller deltas between their simulated optimization outputs 720 and ground truth data 726 across key metrics. Converging towards minimal gaps may lead to forecasts that may be highly tailored to the facilities' and grid's unique needs and realities. Periodic retraining on new data may further adapt models to evolving conditions.

The simulation evaluates forecast model performance over a predefined timeline, such as generated forecast accuracy over, for example, a 48-hour period. The simulation may yield an energy cost result reflecting cumulative delivered energy expenditures over the simulation timeframe resulting from asset control behaviors and operation schedules dictated by the forecasting outputs. Quantifiable performance gaps may be revealed between each model's optimized cost result and a baseline energy cost, such as the actual historical cost data or forecasted result from a reference model over a matching time period. The candidate model demonstrating superior alignment, such as minimizing deviations between its simulated cost and expected baseline value, may be selected as the updated model variant. In certain aspects, such techniques allow interchangeable swapping between different forecasting model types or tuning settings depending on the ability to enhance congruence between model-driven optimization simulations and baseline energy costs captured from operational data. Periodic assessment may provide updating which may be tailored to evolving site conditions.

Implementation of Forecasting Model Training and Selection

Figure 8:
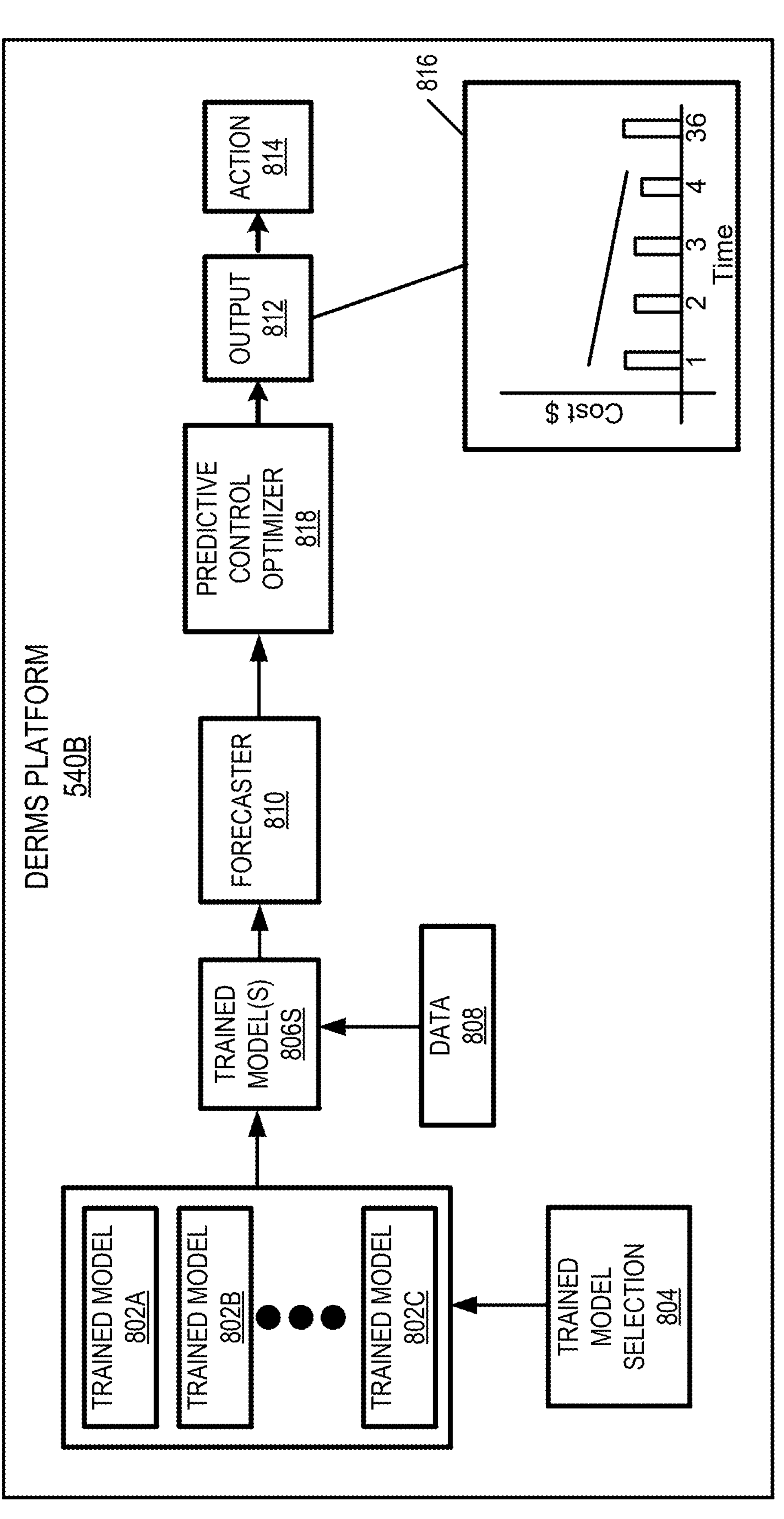
FIG. 8 depicts an example implementation utilizing a trained forecasting model integrated into a DERMS platform, according to aspects provided herein.

FIG. 8 depicts an implementation of a forecasting model training and selection technique using DERMS platform 540B. As depicted in FIG. 8, the implementation of the trained forecasting model includes a trained model selection process 804 which selects one or more trained models 802A-802C from a group of trained candidate models. The trained models 802A-802C may have been trained and/or tuned using the forecasting model training and selection technique described regarding FIG. 7, which may make them tailored to unique optimization objectives and constraints of the specific DERMS implementation of the DERMS platform 540B. Though shown as separate components, one or more of the components depicted in and described with reference to FIG. 8 may be implemented separately, jointly, or as any number of components that perform the discussed functions. Such components may be hardware and/or software, such as processors, memory, computer readable medium, instructions, code, etc.

The selected trained model(s) 806S receive current operational data 808 as inputs to generate multi-day forecasts for quantities like expected solar production, facility electricity loads, electric vehicle charging demands, weather conditions, etc. A forecaster 810 component may leverage the trained model(s) 806S to produce these forecasting outputs at regular intervals, such as every 15 minutes.

The forecasts may be fed into a predictive control optimizer 818. The predictive control optimizer 818 may utilize the forecasts to establish operating schedules and dispatch set points over a planning horizon, such as 48 hours, for assets like batteries, solar inverters, EV chargers, and smart appliances. For example, forecasted solar production levels may guide hourly charging schedules for a fleet of vehicles balanced against grid demand limitations. The predictive control optimizer 818 passes control signals (illustrated as "action") 814 as output 812 to gateway systems at regular intervals, such as every 15 minutes aligned with newly generated forecasts. These control signals 814 provide updated set points like battery storage ramp rate limits, EV charging current capacities, smart appliance energy allotments, renewable power curtailment caps, etc. Real-time sensor data may verify asset responses to validate or update the optimization modeling.

Actual operational metrics captured by sensor equipment may also be returned to the selected trained model(s) 806S (e.g., the trained model(s) 802A-802C) as current operational data 808. This allows continuous refinement of the forecasting relationships to changing site conditions over time. Periodically, repeatedly, continuously and/or at other interval, such as monthly, the latest operational data can also feedback into a retraining pipeline to improve long-term operational forecasting performance within the DERMS implementation.

The output 812 of the predictive control optimizer 818 may provide summarized feedback on forecast-driven outcomes pertaining to operational expenditures, EV charging delivery, solar utilization, grid demand reductions, etc. These metrics may quantify realized cost and energy delivery performance from the guided set points over the prediction windows. Convergence towards ideal optimization targets may validate the trained model alignments with site financial objectives, as indicated by chart 816. Trends in the output 812 may inform strategic adjustments within the DERMS implementation. Underperformance against operational priorities like minimizing and/or reducing costs or ensuring sufficient EV charging may require weighting shifts within the predictive control optimizer 818 logic. Alternatively or in addition, output deficiencies may cause selected trained model(s) 806S (e.g., trained model(s) 802A-802C) to undergo revised constraint tuning, feature selection, or accuracy measurement preferences during retraining.

The trained model selection process 804 may also allow trained model interchangeability based on output feedback. As operational conditions evolve or site infrastructure changes, flexible swapping between trained models 802A-802C (e.g., candidate variants) may cater to changing forecasting requirements. This may prevent overfitting on stale model specifications unreflective of new site realities.

In some implementations, external optimization toolkits can provide the optimization routines and hardware behavior abstractions for internal simulation purposes during model candidate training. Once selected, the trained models may then integrate within the native DERMS platform's optimizer elements for ongoing operational usage. This avoids duplication of internal equipment modeling. Accordingly, the integration of trained model(s) 802A-802C (e.g., trained forecasting model(s)) aligned to the optimization objectives via the techniques described with reference to FIG. 7 may yield output 812 to track cost and delivery metrics and quantify realized gains that are unique to the site's operational constraints and priorities.

Process for Selecting and Training a Forecasting Model

Figure 9:
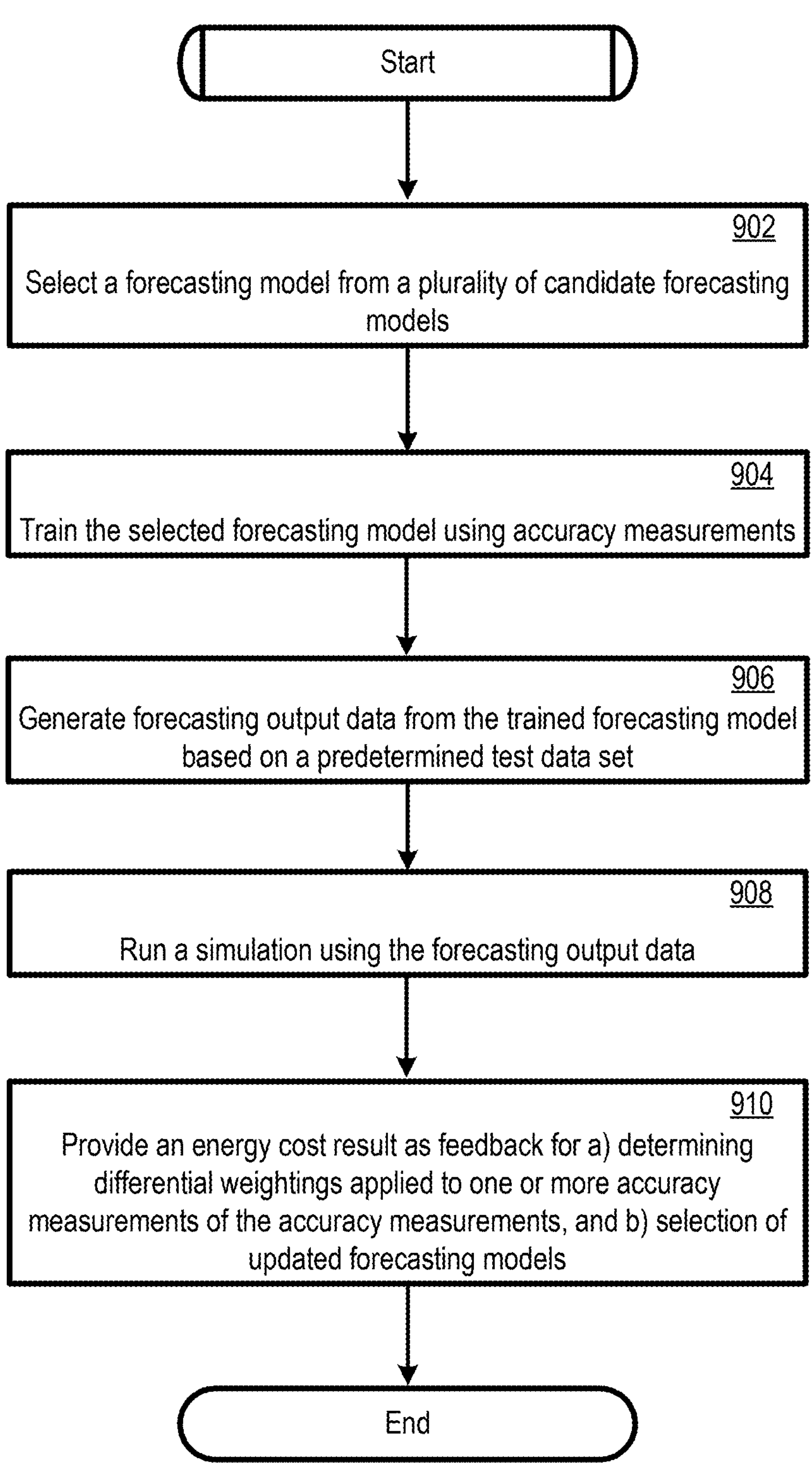
FIG. 9 depicts an example flow diagram for selecting and training a forecasting model for a distributed energy resource management system, according to aspects provided herein.

FIG. 9 depicts an example method 900 for selecting and training a forecasting model for a distributed energy resource management system. In some aspects, method 900 may be implemented by the DERMS platform 540 of FIGS. 5 and 7-8, and/or processing system 1000 of FIG. 10.

Method 900 starts at block 902 with selecting a forecasting model from a plurality of candidate forecasting models. In certain aspects, the plurality of candidate forecasting models may include at least two different types of models.

The method 900 then continues to block 904 with training the selected forecasting model using accuracy measurements. In some examples, the accuracy measurements may include at least one of root mean squared error (RMSE), mean absolute error (MAE), or mean squared error (MSE).

The method 900 then continues to block 906 with generating forecasting output data from the trained forecasting model based on a predetermined test data set.

The method 900 then continues to block 908 with running a simulation using the forecasting output data, the simulation utilizing optimization logic and constraints to simulate control behaviors of distributed energy resources including at least one of photovoltaic solar panels, energy storage systems, or electric vehicle charging stations, where the simulation may be run by generating operating set points over a specified timeframe based on the forecasting output data to yield an energy cost result based on delivered energy expenditures.

The method 900 then continues to block 910 with providing the energy cost result as feedback for a) determining differential weightings applied to one or more accuracy measurements of the accuracy measurements by increasing penalties applied to the one or more accuracy measurements to penalize over-prediction errors based on time-of-use pricing, and b) selection of an updated forecasting model from the plurality of candidate forecasting models by comparing the energy cost result against a baseline energy cost to identify one or more forecasting models of the plurality of candidate forecasting models that minimize deviations from the baseline energy cost.

In some aspects of method 900, the plurality of candidate forecasting models are selected from the group consisting of gradient boosted machine models, neural network models, autoregressive integrated moving average models, generalized linear models, and linear regression models.

In some aspects of method 900, the selected forecasting model is a gradient boosted machine model.

In some aspects of method 900, the generating of the forecasting output data includes generating solar generation forecasting data.

In some aspects of method 900, the generating of the forecasting output data further includes generating facility load forecasting data.

In some aspects of method 900, the solar generation forecasting data and the facility load forecasting data cover a three day time horizon.

In some aspects of method 900, the predetermined test data set covers a time span selected from the group consisting of one month, one quarter, and one year.

In some aspects of method 900, representative days are picked from the predetermined test data set to reduce computation time.

In some aspects of method 900, the accuracy measurements are selected based on electricity tariff conditions of a distributed energy resource site.

In some aspects of method 900, the over-prediction errors are penalized during model training based on the time-of-use pricing.

In some aspects, the method 900 further includes retraining the selected forecasting model on a periodic basis using updated operational data.

In some aspects of method 900, the periodic retraining occurs on a weekly or monthly basis.

In some aspects, the method 900 further includes: selecting an additional plurality of candidate forecasting models; training the additional plurality of candidate forecasting models using the accuracy measurements; testing the trained additional plurality of candidate forecasting models using a different predetermined test data set; generating additional forecasting output data from the trained additional plurality of candidate forecasting models based on the different predetermined test data set; running an additional simulation using the additional forecasting output data to yield a supplemental energy cost result; and comparing the energy cost result from the simulation with the supplemental energy cost result to determine an improved candidate model.

In some aspects, the method 900 further includes: incorporating external weather forecast data into an additional predetermined test data set; modifying cost factors utilized by the additional simulation to reflect adjusted electricity tariff conditions; and applying a bias to the additional simulation to penalize the over-prediction errors based on the time-of-use pricing to a greater degree than penalized from the differential weightings.

In some aspects of method 900, running the additional simulation includes: mapping the additional forecast output data to energy storage set points and renewable energy curtailment limits; modeling corresponding equipment behavior based on the mapped energy storage set points to generate simulated site conditions; deriving aggregated equipment wear impacts relative to fluctuation in the mapped energy storage set points; and combining the delivered energy expenditures with projected equipment wear costs to generate the supplemental energy cost result of the additional simulation.

Note that FIG. 9 is just one example of a method, and other methods including fewer, additional, or alternative steps are possible consistent with this disclosure.

Example Processing System for Selecting and Training a Forecasting Model

Figure 10:
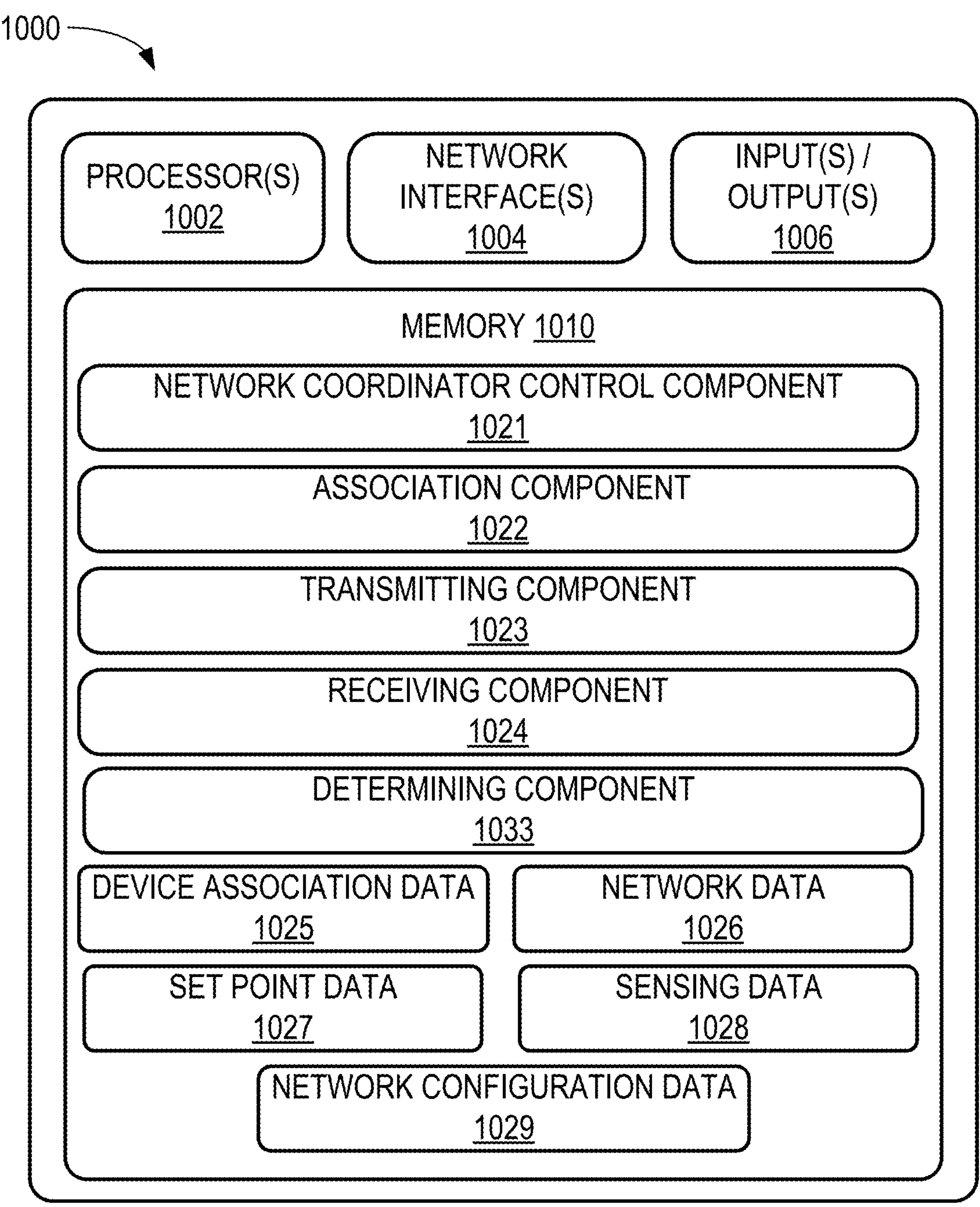
FIG. 10 depicts an example processing system configured for selecting and training a forecasting model for a distributed energy resource management system, according to aspects provided herein.

FIG. 10 depicts an example processing system 1000 configured to select and train a forecasting model.

Processing system 1000 includes one or more processors 1002. Generally, a processor 1002 is configured to execute computer-executable instructions (e.g., software code) to perform various functions, as described herein.

Processing system 1000 further includes one or more network interface(s) 1004, which generally provide(s) data access to any sort of data network, including personal area networks (PANs), local area networks (LANs), wide area networks (WANs), the internet, and the like.

Processing system 1000 further includes input(s) and output(s) 1006, which generally provide means for providing data to and from processing system 1000, such as via connection to computing device peripherals, including user interface peripherals.

Processing system 1000 further includes a memory 1010 comprising various components. In this example, memory 1010 includes a network coordinator control component 1021, an association component 1022, a transmitting component 1023, a receiving component 1024, a determining component 1033, device association data 1025, network data 1026, set point data 1027, sensing data 1028, and network configuration data 1029.

Processing system 1000 may be implemented in various ways. For example, processing system 1000 may be implemented as a computing device 402 within core device 302, described above with respect to FIGS. 3 and 4. Note that in various implementations, aspects may be omitted, added, or substituted from processing system 1000.

EXAMPLE CLAUSES

Implementation examples are described in the following numbered clauses:

Clause 1: A method for selecting and training a forecasting model for a distributed energy resource management system (DERMS), the method comprising: selecting a forecasting model from a plurality of candidate forecasting models comprising at least two different types of models; training the selected forecasting model using accuracy measurements comprising at least one of root mean squared error (RMSE), mean absolute error (MAE), or mean squared error (MSE); generating forecasting output data from the trained forecasting model based on a predetermined test data set; running a simulation using the forecasting output data, the simulation utilizing optimization logic and constraints to simulate control behaviors of distributed energy resources comprising at least one of photovoltaic solar panels, energy storage systems, or electric vehicle charging stations, the simulation being run by generating operating set points over a specified timeframe based on the forecasting output data to yield an energy cost result based on delivered energy expenditures; and providing the energy cost result as feedback for a) determining differential weightings applied to one or more accuracy measurements of the accuracy measurements by increasing penalties applied to the one or more accuracy measurements to penalize over-prediction errors based on time-of-use pricing, and b) selection of an updated forecasting model from the plurality of candidate forecasting models by comparing the energy cost result against a baseline energy cost to identify one or more forecasting models of the plurality of candidate forecasting models that minimizes deviations from the baseline energy cost.

Clause 2: The method in accordance with Clause 1, wherein the plurality of candidate forecasting models are selected from the group consisting of gradient boosted machine models, neural network models, autoregressive integrated moving average models, generalized linear models, and linear regression models.

Clause 3: The method in accordance with Clause 2, wherein the selected forecasting model is a gradient boosted machine model.

Clause 4: The method in accordance with any one of Clauses 1-3, wherein the generating of the forecasting output data comprises generating solar generation forecasting data.

Clause 5: The method in accordance with Clause 4, wherein the generating of the forecasting output data further comprises generating facility load forecasting data.

Clause 6: The method in accordance with Clause 5, wherein the solar generation forecasting data and the facility load forecasting data cover a three day time horizon.

Clause 7: The method in accordance with any one of Clauses 1-6, wherein the predetermined test data set covers a time span selected from the group consisting of one month, one quarter, and one year.

Clause 8: The method in accordance with any one of Clauses 1-7, wherein representative days are picked from the predetermined test data set to reduce computation time.

Clause 9: The method in accordance with any one of Clauses 1-8, wherein the accuracy measurements are selected based on electricity tariff conditions of a distributed energy resource site.

Clause 10: The method in accordance with any one of Clauses 1-9, wherein the over-prediction errors are penalized during model training based on the time-of-use pricing.

Clause 11: The method in accordance with any one of Clauses 1-10, further comprising retraining the selected forecasting model on a periodic basis using updated operational data.

Clause 12: The method in accordance with Clause 11, wherein the periodic retraining occurs on a weekly or monthly basis.

Clause 13: The method in accordance with any one of Clauses 1-12, further comprising: selecting an additional plurality of candidate forecasting models; training the additional plurality of candidate forecasting models using the accuracy measurements; testing the trained additional plurality of candidate forecasting models using a different predetermined test data set; generating additional forecasting output data from the trained additional plurality of candidate forecasting models based on the different predetermined test data set; running an additional simulation using the additional forecasting output data to yield a supplemental energy cost result; and comparing the energy cost result from the simulation with the supplemental energy cost result to determine an improved candidate model.

Clause 14: The method in accordance with Clause 13, further comprising: incorporating external weather forecast data into an additional predetermined test data set; modifying cost factors utilized by the additional simulation to reflect adjusted electricity tariff conditions; and applying a bias to the additional simulation to penalize the over-prediction errors based on the time-of-use pricing to a greater degree than penalized from the differential weightings.

Clause 15: The method in accordance with Clause 14, wherein running the additional simulation comprises: mapping the additional forecast output data to energy storage set points and renewable energy curtailment limits; modeling corresponding equipment behavior based on the mapped energy storage set points to generate simulated site conditions; deriving aggregated equipment wear impacts relative to fluctuation in the mapped energy storage set points; and combining the delivered energy expenditures with projected equipment wear costs to generate the supplemental energy cost result of the additional simulation.

Clause 16: A processing system, comprising: one or more memories comprising computer-executable instructions; and one or more processors configured to execute the computer-executable instructions and cause the processing system to perform a method in accordance with any one of Clauses 1-15.

Clause 17: A processing system, comprising means for performing a method in accordance with any one of Clauses 1-15.

Clause 18: A non-transitory computer-readable medium storing program code for causing a processing system to perform the steps of any one of Clauses 1-15.

Clause 19: A computer program product embodied on a computer-readable storage medium comprising code for performing a method in accordance with any one of Clauses 1-15.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented, or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database, or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) (logic) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for selecting and training a forecasting model for a distributed energy resource management system (DERMS), the method comprising:

selecting a forecasting model from a plurality of candidate forecasting models comprising at least two different types of models;

training the selected forecasting model using a plurality of accuracy measurements comprising at least one of root mean squared error (RMSE), mean absolute error (MAE), or mean squared error (MSE);

generating, using the trained forecasting model and based on a predetermined test data set, forecasting output data;

running a simulation using the forecasting output data, the simulation utilizing an optimization logic and one or more constraints to simulate one or more control behaviors of one or more distributed energy resources the one or more distributed energy resources comprising at least one of a photovoltaic solar panel, an energy storage system, or an electric vehicle charging station, the simulation being run by generating, based on the forecasting output data, one or more operating set points over a timeframe to yield an energy cost result based on a delivered energy expenditure associated with the simulation;

providing the energy cost result as a feedback for a) determining a plurality of differential weightings applied to one or more accuracy measurements of the plurality of accuracy measurements by increasing one or more penalties applied to the one or more accuracy measurements to penalize an over-prediction error based on time-of-use pricing, and b) selection of an updated forecasting model from the plurality of candidate forecasting models by comparing the energy cost result against a baseline energy cost to identify one or more forecasting models of the plurality of candidate forecasting models that minimize deviation from the baseline energy cost;

retraining, based on the feedback, the trained forecasting model to yield the updated forecasting model;

generating using the updated forecasting model, one or more control signals, and actuating at least one distributed energy resource of the one or more distributed energy resources by transmitting at least one control signal of the one or more control signals to the at least one distributed energy resource.

2. The method of claim 1, wherein the plurality of candidate forecasting models comprise one or more of a gradient boosted machine model, a neural network model, an autoregressive integrated moving average model, a generalized linear model, or a linear regression model.

3. The method of claim 2, wherein selecting the forecasting model comprises selecting the gradient boosted machine model.

4. The method of claim 1, wherein generating the forecasting output data comprises generating solar generation forecasting data.

5. The method of claim 4, wherein generating the forecasting output data further comprises generating facility load forecasting data.

6. The method of claim 5, wherein the solar generation forecasting data and the facility load forecasting data cover a three day time horizon.

7. The method of claim 1, wherein the predetermined test data set covers a time span selected from the group consisting of one month, one quarter, and one year.

8. The method of claim 1, wherein generating the forecasting output data based on the predetermined test data set comprises generating the forecasting output data based on one or more instances of test data associated with one or more representative days to reduce computation time.

9. The method of claim 1, wherein the plurality of accuracy measurements are selected based on one or more electricity tariff conditions of a distributed energy resource site.

10. The method of claim 1, wherein the over-prediction error is penalized based on the time-of-use pricing during model training.

11. The method of claim 1, wherein retraining the trained forecasting model comprises retraining the trained forecasting model on a periodic basis using updated operational data.

12. The method of claim 11, wherein retraining the trained forecasting model on the periodic basis comprises retraining the trained forecasting model on a weekly basis or a monthly basis.

13. The method of claim 1, further comprising:

selecting a plurality of additional candidate forecasting models;

training the plurality of additional candidate forecasting models using the plurality of accuracy measurements;

testing the plurality of trained additional candidate forecasting models using another predetermined test data set different than the predetermined test data set;

generating additional forecasting output data from the plurality of trained additional plurality of candidate forecasting models based on the other predetermined test data set;

running an additional simulation using the additional forecasting output data to yield a supplemental energy cost result; and comparing the energy cost result from the simulation with the supplemental energy cost result to determine a candidate forecasting model associated with an improvement in forecasting performance based on comparing the energy cost result from the simulation with the supplemental energy cost result.

14. The method of claim 13, further comprising:

incorporating external weather forecast data into an additional predetermined test data set;

modifying one or more cost factors utilized by the additional simulation to reflect one or more adjusted electricity tariff conditions; and applying a bias to the additional simulation to penalize the over-prediction error based on the time-of-use pricing to a greater degree than penalization by the one or more increased penalties applied for determining the plurality of differential weightings.

15. The method of claim 14, wherein running the additional simulation comprises:

mapping the additional forecasting output data to at least one of one of more energy storage set points or one or more renewable energy curtailment limits;

modeling a corresponding equipment behavior based on the at least one of the one or more energy storage set points or the one or more renewable energy curtailment limits to generate one or more simulated site conditions;

deriving an aggregated equipment wear impact relative to fluctuation in the at least one of the one or more energy storage set points or the one or more renewable energy curtailment limits; and combining the delivered energy expenditure with a projected equipment wear cost to generate the supplemental energy cost result of the additional simulation.

16. An apparatus for selecting and training a forecasting model for a distributed energy resource management system (DERMS), the apparatus comprising:

one or more memories configured to store a plurality of candidate forecasting models; and one or more processors coupled to the one or more memories, the one or more processors configured to:

select a forecasting model from the plurality of candidate forecasting models;

train the selected forecasting model using a plurality of accuracy measurements comprising at least one of root mean squared error (RMSE), mean absolute error (MAE), or mean squared error (MSE);

generate, using the trained forecasting model and based on a predetermined test data set, forecasting output data;

run a simulation using the forecasting output data, the simulation utilizing an optimization logic and one or more constraints to simulate one or more control behaviors of one or more distributed energy resources, the one or more distributed energy resources comprising at least one of a photovoltaic solar panel, an energy storage system, or an electric vehicle charging station, wherein, to run the simulation using the forecasting output data, the one or more processors are configured to generate, based on the forecasting output data, one or more operating set points over a timeframe to yield an energy cost result based on a delivered energy expenditure associated with the simulation;

provide the energy cost result as a feedback to a) determine a plurality of differential weightings applied to one or more accuracy measurements of the plurality of accuracy measurements by increasing one or more penalties applied to the one or more accuracy measurements to penalize an over-prediction error based on time-of-use pricing, and b) select an updated forecasting model from the plurality of candidate forecasting models by comparing the energy cost result against a baseline energy cost to identify one or more forecasting models of the plurality of candidate forecasting models that minimize deviation from the baseline energy cost;

retrain, based on the feedback, the trained forecasting model to yield the updated forecasting model;

generate, using the updated forecasting model, one or more control signals; and actuate at least one distributed energy resource of the one or more distributed energy resources by transmitting at least one control signal of the one or more control signals to the at least one distributed energy resource.

17. The apparatus of claim 16, wherein the plurality of candidate forecasting models comprise one or more of a gradient boosted machine model, a neural network model, an autoregressive integrated moving average model, a generalized linear model, or a linear regression model.

18. A non-transitory computer-readable medium storing instructions that, when executed by one or more processors, cause the one or more processors to:

select a forecasting model from a plurality of candidate forecasting models;

train the selected forecasting model using a plurality of accuracy measurements comprising at least one of root mean squared error (RMSE), mean absolute error (MAE), or mean squared error (MSE);

generate, using the trained forecasting model and based on a predetermined test data set, forecasting output data;

run a simulation using the forecasting output data, the simulation utilizing an optimization logic and one or more constraints to simulate one or more control behaviors of one or more distributed energy resources, the one or more distributed energy resources comprising at least one of a photovoltaic solar panel, an energy storage system, or an electric vehicle charging station, wherein, to cause the one or more processors to run the simulation using the forecasting output data, the instructions cause the one or more processors to generate, based on the forecasting output data, one or more operating set points over a timeframe to yield an energy cost result based on delivered energy expenditure associated with the simulation;

provide the energy cost result as a feedback to a) determine a plurality of differential weightings applied to one or more accuracy measurements of the plurality of accuracy measurements by increasing one or more penalties applied to the one or more accuracy measurements to penalize an over-prediction error based on time-of-use pricing, and b) select an updated forecasting model from the plurality of candidate forecasting models by comparing the energy cost result against a baseline energy cost to identify one or more forecasting models of the plurality of candidate forecasting models that minimize deviation from the baseline energy cost;

retrain, based on the feedback, the trained forecasting model to yield the updated forecasting model;

generate, using the updated forecasting model, one or more control signals; and actuate at least one distributed energy resource of the one or more distributed energy resources by transmitting at least one control signal of the one or more control signals to the at least one distributed energy resource.

19. The non-transitory computer-readable medium of claim 18, wherein the plurality of candidate forecasting models comprise one or more of a gradient boosted machine model, a neural network model, an autoregressive integrated moving average model, a generalized linear model, or a linear regression model.

20. The non-transitory computer-readable medium of claim 18, wherein the plurality of accuracy measurements are selected based on one or more electricity tariff conditions of a distributed energy resource site.

* * * * *